(12) United States Patent
Pfister et al.

(10) Patent No.: US 6,396,496 B1
(45) Date of Patent: May 28, 2002

(54) METHOD FOR MODELING GRAPHICAL OBJECTS REPRESENTED AS SURFACE ELEMENTS

(75) Inventors: Hanspeter Pfister, Somerville, MA (US); Jeroen van Baar, Den Helder; Collin E. Oosterbaan, Langeraar, both of (NL)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 09/240,278

(22) Filed: Jan. 29, 1999

(51) Int. Cl.[7] ............................................... G06T 15/20

(52) U.S. Cl. ..................... 345/427; 345/420; 345/423; 345/619; 345/424

(58) Field of Search ................................ 345/420, 424, 345/473, 427, 474, 423, 619

(56) References Cited

U.S. PATENT DOCUMENTS

| | | | | |
|---|---|---|---|---|
| 5,581,672 A | * | 12/1996 | Letcher, Jr. .................. | 345/420 |
| 5,590,261 A | * | 12/1996 | Sclaroff et al. .............. | 345/473 |
| 5,835,693 A | * | 11/1998 | Lynch et al. ................. | 345/473 |
| 6,067,096 A | * | 5/2000 | Nagle ........................... | 345/473 |
| 6,069,634 A | * | 5/2000 | Gibson ........................ | 345/424 |

* cited by examiner

Primary Examiner—Mark Zimmerman
Assistant Examiner—Kimbinh T. Nguyen
(74) Attorney, Agent, or Firm—Dirk Brinkman; Andrew Curtin

(57) ABSTRACT

Provided is a method for modeling a representation of a graphic object. A surface of the object is partitioned into a plurality of cells having a grid resolution related to an image plane resolution. A single zero-dimensional surface element is stored in the memory for each cell located on the surface of the object. The surface elements in adjacent cells are connected by links, and attributes of the portion of the object contained in the cell are assigned to each surface element and each link. The location of the attributed surface elements can be moved according to forces acting on the object.

16 Claims, 32 Drawing Sheets

```
for every surfel in sequential list do {
  for each surfel_link do {
    neighbor_surfel <- link <- GetSurfelRight
    link_force <- Compute_Force (surfel,neighbor,link)
    surfel<- SetSurfelForce (link_force + GetSurfelForce(surfel)
    neighbor <- Set SurfelForce (-link_force + GetSurfelForce(neighbor))
  }
}
function Compute_Force (surfel_i<surfel_j,link)
{
  return <- compute forces according to equation (13)
}
```

```
wrapper (t, t_new)
{
    for every surfel_object do {
        x <- State_to_Vector (surfel_object)
        surfel_object <- Accumulate_Forces()
        err_scale <- Determine_Error_Scale (surfel_object)
        driver (t, t_new, x, x_new, err_scale, derivs_f, surfel_object)
        surfel_object <- Vector_to_State (x_new)
    }
}
```

FIG. 21

METHOD FOR MODELING GRAPHICAL OBJECTS REPRESENTED AS SURFACE ELEMENTS

FIELD OF THE INVENTION

This invention relates generally to graphics systems, and more particularly, to modeling graphic objects that are represented by connected zero-dimensional points.

BACKGROUND OF THE INVENTION

In computer graphics, one can represent objects in 3D space in many different ways using various primitive graphic elements. The known representations that are commonly used to represent graphic objects are implicit, geometric, volumetric, and particle.

Implicit

In an implicit representation, the graphic object can be generated from arbitrary mathematical and/or physical functions. For example, to draw the outline of a hollow sphere one simply supplies the rendering engine with the function (in Cartesian coordinates) $x^2+y^2+z^2=r$, and for a solid sphere the function is $x^2+y^2+z^2 \leq r$. Color and other material properties can similarly be synthetically generated. Functions can be used to describe various geometric shapes, physical objects, and real or imaginary models. Implicit functions are not suitable for synthezising complex objects, for example, a human figure.

Geometric Representation

Classically, 3D objects have been geometrically modeled as a mesh of polygonal facets. Usually the polygons are triangles. The size of each facet is made to correspond to the degree of curvature of the object in the region of the facet. Many polygons are needed where the object has a high degree of curvature, fewer for relatively flat regions. Polygon models are used in many applications, such as, virtual training environments, 3D modeling tools, and video games. As a characteristic, geometric representations only deal with the surface features of graphic objects.

However, problems arise when a polygon model is deformed because the size of the facets may no longer correspond to local degrees of curvature in the deformed object. Additionally, deformation may change the relative resolution of local regions. In either case, it becomes necessary to re-mesh the object according to the deformed curvature. Because re-meshing (polygonization) is relatively expensive in terms of computational time, it is usually done as a preprocessing step. Consequently, polygon models are not well suited for objects that need to be deformed dynamically.

Volumetric Representation

In an alternative representation, the object is sampled in 3D space to generate a volumetric data set, for example, a MRI or CT scan. Each sample is called a voxel. A typical data set may include millions of voxels. To can be identified to focus on specific volumetric regions. For instance, a volumetric data set of the human head may segment the voxels according to material properties, such as bone and soft tissue.

Because of the large number of voxels, physically-based modeling and the deformation of volumetric data sets is still a very computationally expensive operation. Often, one is only interested in surface features, and the interior of the object can effectively be ignored.

Particle Representation

A particle representation of objects is often used to model fluid flows, for example, in wind tunnel simulations. Certain attributes, such as orientation velocity, are given to particles in order to track individual particles through the fluid flow, or to visualize the complete flow. Another application of particle representation is in the visualization of "cloud like" objects, such as smoke, dust or mist. A shading model can be applied to particles that emit light to render cloud like objects. Also, particles can be constrained to subspaces with the help of energy functions to model surfaces. An advantage of particle clouds is that the clouds are very deformable. As a disadvantage, the particles in the cloud are unconnected and behave individually when exposed to forces. Furthermore, particles are quite unsuitable to represent surface structures of solid objects or models.

Modeling Considerations

A number of techniques are known for non-physical and physical modeling of graphic objects in the various representations. Non-physically based models often use splines, Bezier curves, and the like. There, control points are manipulated to achieve the desired degree of deformation.

The physical techniques generally fall into two categories, rigid body mechanics, and dynamic deformation. Rigid body mechanics usually solve differential equations that follow from Newtonian mechanics. In computer systems, numerically integrators can be used to solve the differential equations. Dynamic deformation can be modeled by finite element methods (FEM), or mass-spring systems.

Rendering Considerations

The rendering time for these conventional primitives depends on the complexity of the objects modeled. For example, with a geometric representation of a complex object, the polygons are typically very small in size, about the size of a pixel, and the object is represented by many polygons. The polygons are usually represented with vertices that define a triangle.

To render a polygon, the projection of the triangle is scan-converted (rasterized) to calculate the intensity of each pixel that falls within the projection. This is a relatively time consuming operation when about one pixel or less is covered by the polygon. Replacing the polygons with point samples and projecting the point samples to the screen can be a more efficient technique to render objects.

A number of techniques are known for rendering volumes. In general, volume rendering is quite complex. Unless the number of voxels is limited, real-time rendering can be time consuming.

A real-time rendering system, described in U.S. Pat. No. 5,781,194 "Real-time Projection of Voxel-based Object," issued to Ponomarov et al. on Jul. 14, 1998, constructs a chain of surface voxels using incremental vectors between surface voxels. That representation succeeds in modeling and displaying objects showing highly detailed surface regions. The modeling of rigid body motion is done with the aid of scripting mechanisms that lacks realism because physically-based methods are not used. This approach does not include the possibility of realistic deformation of objects. The objects act as rigid bodies in space that are unresponsive to collisions and other deforming forces.

In the prior art, discrete particles or points have been used as a meta-primitive in graphic systems, see, Levoy et al, "The Use of Points as a Display Primitive," University of North Carolina Technical Report 85-022, 1985. They described a process for converting an object to a point representation. There, each point has a position and a color. They also describe a process to render the points as a smooth surface.

The points are modeled as zero-dimensional density samples and are rendered using an object-order projection.

When rendering, multiple points can project to the same pixel and the intensities of these points may need to be filtered to obtain a final intensity for the pixel under consideration. This filtering is done by weighing the intensity proportional to the distance from the projected point position on the screen to the corresponding pixel-center. The weighing is modeled with a Gaussian filter. An enhanced depth-buffer (Z-buffer) allows for depth comparisons with a tolerance that enables the blending of points in a small region of depth-values. As an advantage, their point representation allows one to render the object from any point of view.

In another technique, as described by Grossman et al. in "Sample Rendering," Proceedings of the Eurographics Workshop '98, Rendering Techniques 1998, Drettakis, G., Max, N.(eds.), pages 181–192, July 1998, the point samples are obtained by sampling orthographic projections of triangle meshes on an equilateral triangle lattice. For each triangle of the lattice that is covered by the projection of the triangle mesh, a sample point is added. An equilateral triangle lattice was chosen to provide an adequate sampling which is dense enough to guarantee that each pixel is covered by at least one sample.

All of the known representations have some limitations. Therefore, what is desired is a representation that combines the best features and simplifies modeling and rendering.

SUMMARY OF THE INVENTION

Provided is a method for modeling a representation of a graphic object. A surface of the object is partitioned into a plurality of cells having a grid resolution related to an image plane resolution. A single zero-dimensional surface element is stored in the memory for each cell located on the surface of the object. The surface elements in adjacent cells are connected by links, and attributes of the portion of the object contained in the cell are assigned to each surface element and each link. The location of the attributed surface elements can be moved according to forces acting on the object.

The object attributes assigned to each surface element can include a position of the surface element on the surface of the object, a velocity of the element, a mass of the portion of the object contained in the corresponding cell, and the attributes assigned to each link can include a rest length of the distance between two adjacent surface elements connected by the link.

BRIEF DESCRIPTION OF THE DRAWINGS

FIG. 19 is a procedure for accumulating forces on a surfel object;

FIG. 21 shows a procedure for generating a dynamic state vector;

DETAILED DESCRIPTION OF PREFERRED EMBODIMENTS

1. Introduction and Overview

We describe the generating, modeling, and rendering of graphic objects represented as surface elements, or "surfels." We define surfels as connected zero-dimensional point samples in a 3D surfel grid. The 3D grid according to our invention is a projection of the image plane resolution into the object space, resulting in a 3D volume with pixel-sized spacing of the surfels. In contrast, prior art rendering primitives are usually sampled in object space.

Each surfel projects to a pixel of the image-plane. The surfel is located somewhere in a "cell" that is defined by eight nodes that are integer grid positions. This is analogous to the definition of pixels on the image-plane where the intersections of the horizontal and vertical scan-lines are considered the integer pixel-position and the area between four such positions is denoted as the pixel.

A surfel stores information (attributes) about its position, color, opacity, and surface normal at the point position. Additional attributes such as velocity and rest mass can be attributed to surfels representing physical objects or models.

Adjacent surfels are connected to each other by "links." The rest length of a link defines the relative spacing of the surfels. Note, the surfels can be located anywhere in a cell. Additional attributes, such as elasticity and damping can be attributed to links in the case where the object is deformable. The data structures storing surfels and link attributes is a list of items connected by pointers. We say that six adjacent surfels are 8-connected.

Our representation combines object space and image space by defining a one-to-one mapping between surfels and pixels. Surfels are generated according to the screen resolution. Thus, no detail smaller than a pixel is considered when each surfel maps to one pixel.

Our reason for combining the object space and image space is to provide rendering that is simple, efficient and fast.

Surfels can be used as a general rendering primitive. We provide techniques to generate surfels from prior art representations (implicit, geometric, voxel and particle). We propose an object-order projection process using nearest neighbor interpolation to project surfels to their corresponding pixels.

In our representation, surfel objects can interact with each other to result in "physically plausible deformations." To enable deformation, a surfel object can be modeled as a mass-spring system, where each surfel is assigned a mass and is connected to adjacent surfels by springs.

We also describe techniques to enhance image quality when "holes" appear in the surface due to surfels being "pulled" out of their cells by, for example, rotation, or internal and external forces. These techniques include shear-warp of a viewing transform, supersampling or scaling of the object, and splatting.

1.1 Surfels

Figure 1:
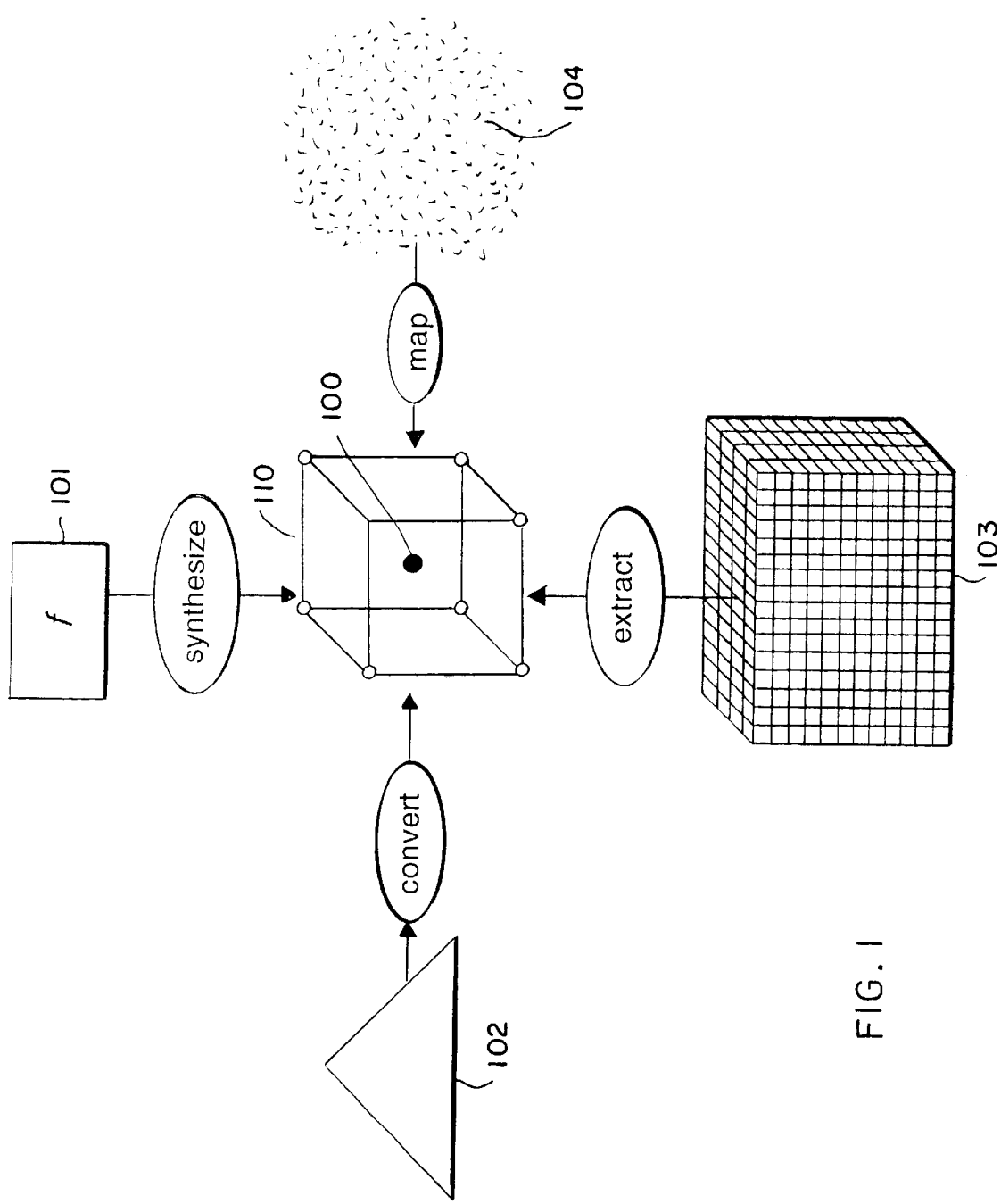
FIG. 1 shows a surface element (surfel) that can be generated by synthesis, conversion, mapping, and extraction from implicit, polygon, voxel, and particle representations, respectively.

As shown in FIG. 1, we describe a graphic primitive that can be used to represent, model, and render objects. We call this primitive a surface element, or "surfel" 100 for short. Surfels can be related to the representations discussed above, namely implicit functions 101, polygons 102, voxels 103, and particles 104. We define the surfel 100 as a zero-dimensional point sample in a cell defined by a 3D grid having the resolution of an image plane. Attributes, such as position, color, and mass, can be assigned to surfels.

A plurality of surfels can be connected to each other to form a 2D manifold, e.g., an arbitrary 2D surface of the object. Surfel manifolds can be connected to each other to form a more complex 2D manifold. The manifold can "outline" arbitrary objects, real or imagined.

1.2 Screen Resolution

Figure 2A:
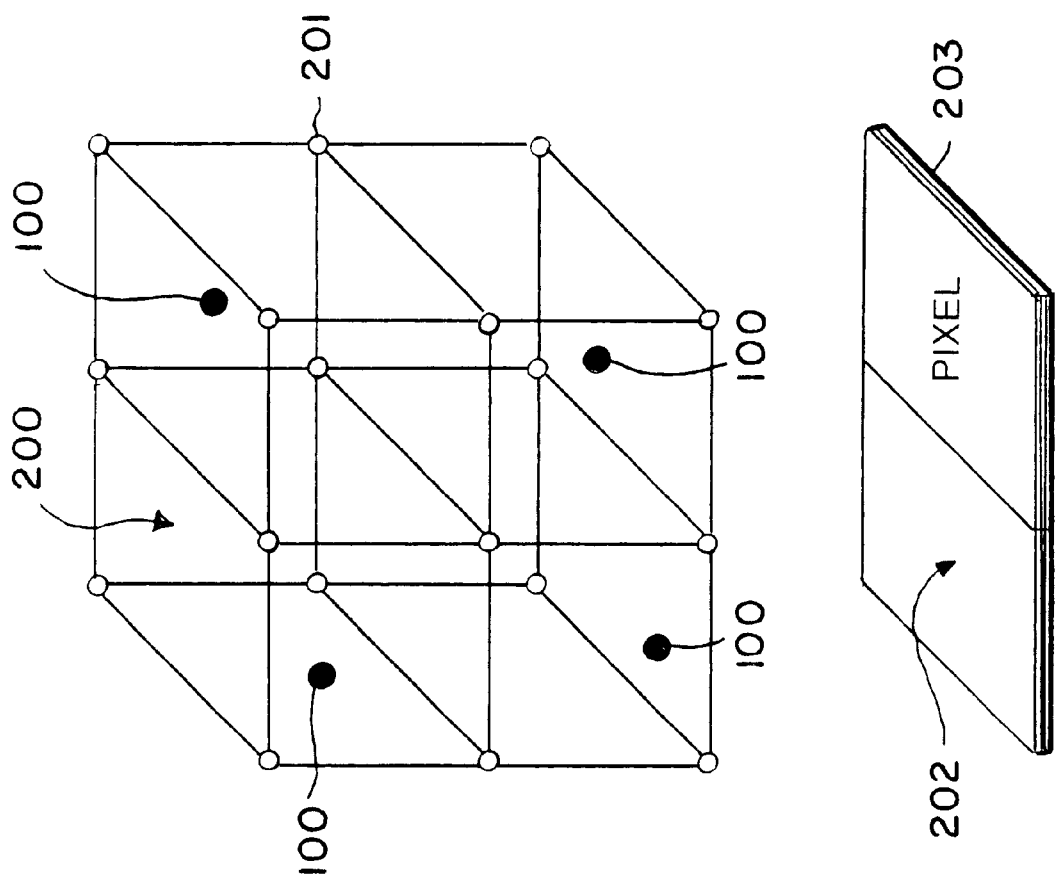
FIGS. 2a and 2b show a grid having an image plane resolution projected into an object to define adjacent cells.
Figure 2B:
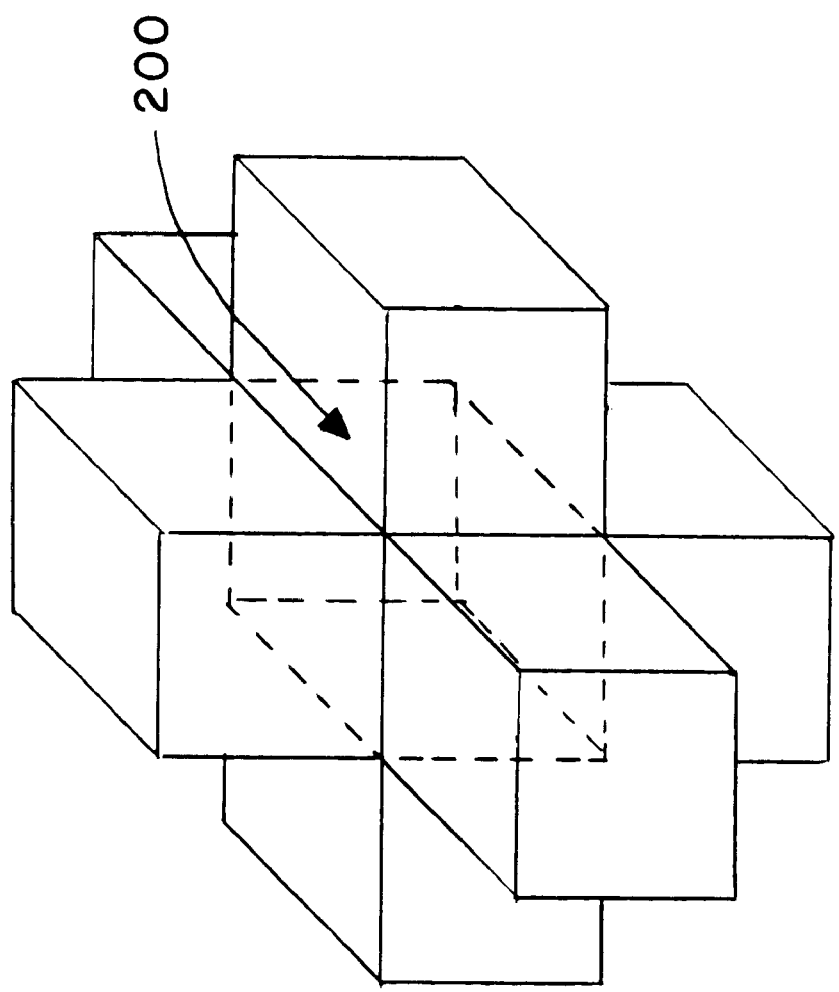

As shown in FIG. 2a, surfels 100 (solid) can be located somewhere in cells 200 defined by eight nodes 201 (open) that are integer grid positions. As shown in FIG. 2b, each surfel has six adjacent surfers, one for each cell adjacent to the faces of each cell 200. The grid positions correspond in size and location to pixels 202 of an image plane 203. In other words, the grid that defines the bounds on the locations of the zero-dimensional surfels is defined at the resolution of an image plane or a display screen.

Sampling according to the screen resolution provides a direct correspondence between object space and image space. By defining surfels this way, deformation of objects becomes easier in the sense that frequent re-sampling is not needed. Processing "surfelized" objects consumes less time. A surfel grid, with pixel-sized spacing, also provides the possibility to store surfels with offsets, and to use a pre-computed view-transformed offset to efficiently render the surfel objects.

1.3 Surfel Links

Figure 3:
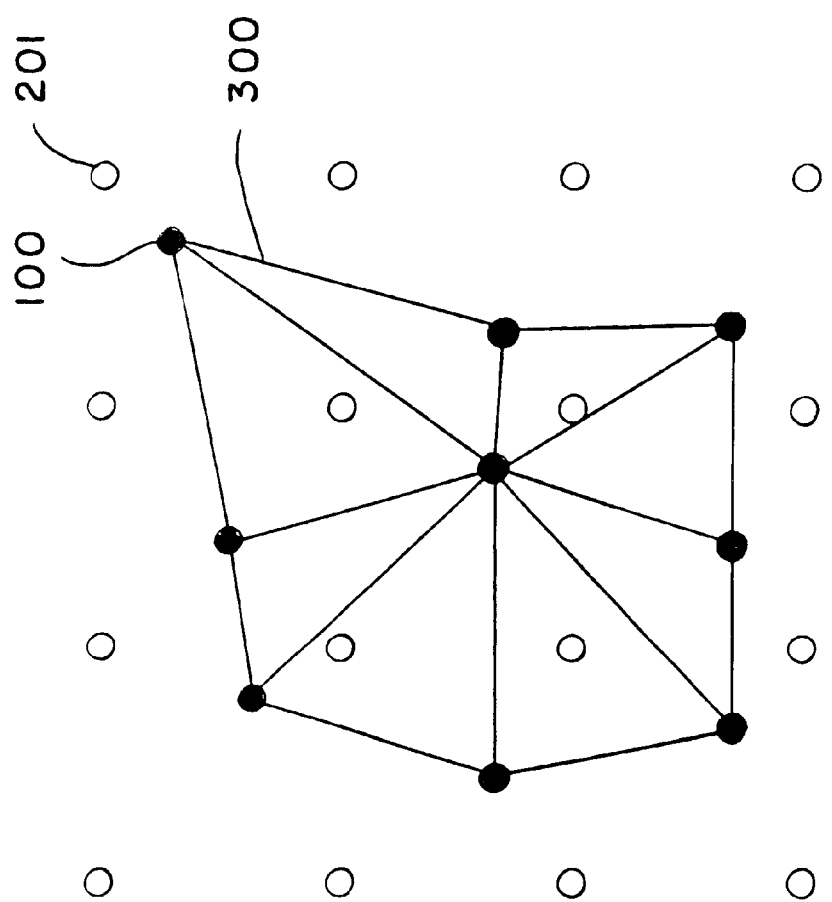
FIG. 3 is a mesh of 6-adjacent 8-connected surfels.

As shown in FIG. 3, we represent a graphic object as a three-dimensional collection of surfels 100 connected by links 300. Therefore, six adjacent surfels are 8-connected. In other words, if the surfel lies somewhere in a cell, the surfel connects through the six faces of the cell and along the diagonals. The connecting links along the diagonal prevent the mesh from "collapsing." The 6-adjacent, 8-connected surfels represent the surface or 2D manifold of a graphic object.

Table A compares prior art polygons, voxels, and particles with surfels according to our invention. The table shows that our surfels have attributes similar to known prior art representation primitives.

TABLE A

| Property | Polygons | (Surface) voxels | Particles | Surfels |
|---|---|---|---|---|
| Geometry | Yes | No | No | No |
| Sampling | Object | Object | Object | Screen |
| Grid | No | Yes | No | Yes |
| Connected | Yes | No | No | Yes |
| Deformation | Semi-hard | Hard | Easy | Easy |

In some ways, a surfel has the attributes of a pixel of a converted polygon when the polygon has a size of about one pixel. A surfel can also be considered as an extracted 8-connected surface voxel, where the cell in which the surfel is located has a dimension of 1×1×1 pixel, and has six adjacent surfers. A surfel object can also be thought of as a mapping of a particle cloud that is defined on the resolution of the screen or image grid.

Surfels also have differences. For example, surfels are unlike voxels and particles in their geometry. Surfels are unlike polygons and particles with respect to a grid. Surfels are unlike voxels and particles in the way they are linked. And, surfels are unlike polygons and voxels in the way they are deformed.

Compared with prior art primitives, the most important difference in the way that we define surface elements is that they are sampled according to the screen resolution. Voxels and particles are usually sampled according to the object resolution. Polygons can be sampled at screen resolution. However, the sampling must be done just prior to projection or rendering when the object is deformed. For surfels, the sampling to screen resolution can be done once in a pre-processing step.

In the screen resolution sampling according to our invention, graphic objects include just enough surfels to reconstruct the surface of the object by a simple projection of each surfel to each nearest pixel. For example, a rectangular surfel polygon of 100 by 100 surfels will produce an image plane of 100 by 100 pixels on the screen. We map surfels directly to pixels. The contribution of a surfel to the screen will not be smaller or larger than one pixel.

2. Surfel Object Data Structures

Figure 4:
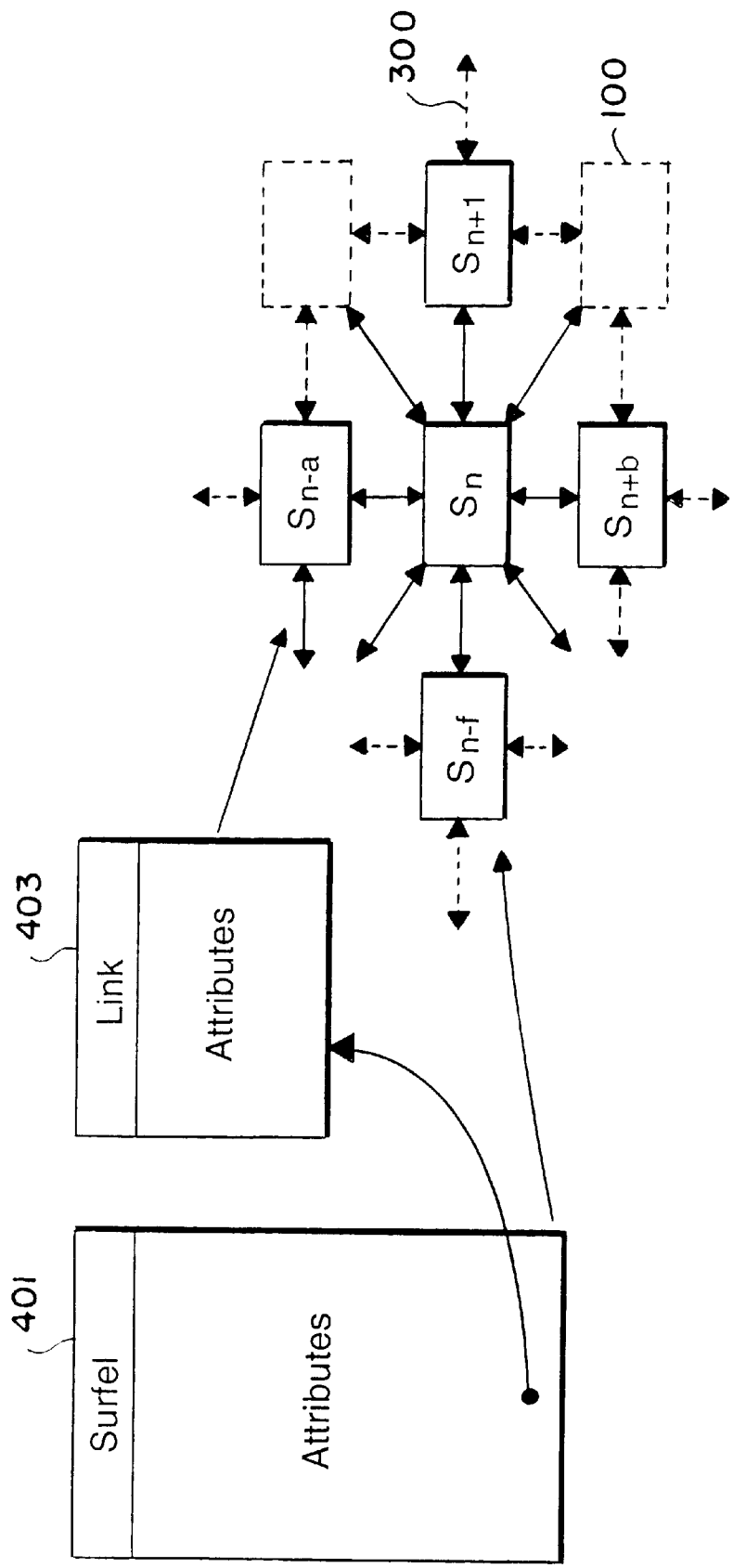
FIG. 4 is a block diagram of surfel data structures.
Figure 5:
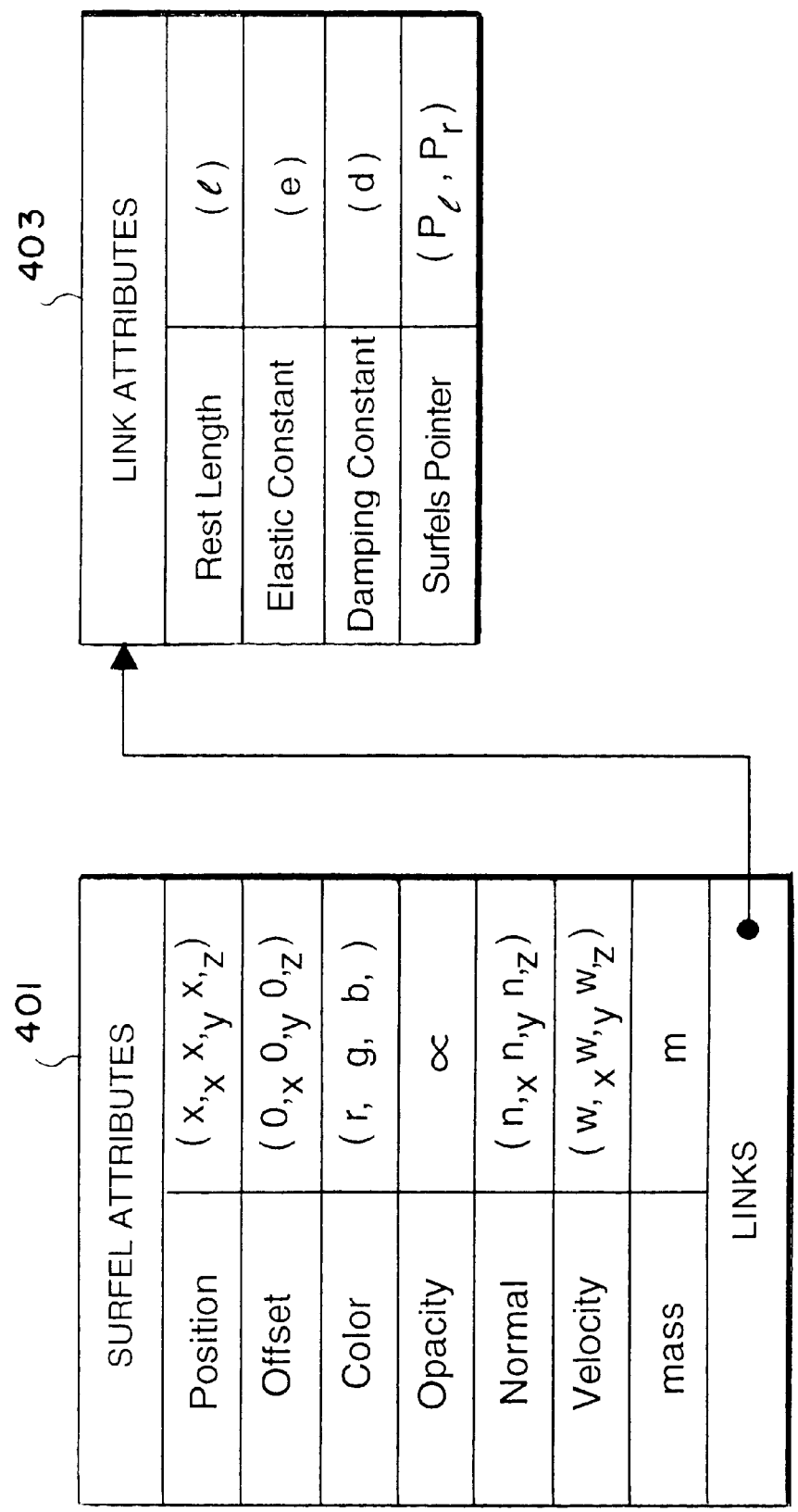
FIG. 5 is block diagram of surfel attributes.

As shown in FIG. 4, each surfel 100 has a set of associated surfel attributes 401 and each link 300 has link attributes 403. The attributes used to model and render the object are shown in greater detail in FIG. 5.

The surfel attributes 401 can include: position (x), offset (o), color (rgb), opacity ($\alpha$), normal (n), angular velocity ($\omega$), normal (n) rest mass (m), and up to eight links. The link attributes 403 can include: rest length (l), elastic constant (e), damping constant (d), and left and right surfel pointers ($p_l$ and $P_r$).

The reason that the normal is stored with each surfel is to avoid interpolation of the normal during rendering. Instead, the normal is interpolated while generating the surfels. Storing the normal is a trade-off between rendering speed and storage-capacity needed for surfel objects.

Each surfel can also have additional attributes describing a dynamic state of the surfel object during modeling, these are described in greater detail with reference to FIGS. 15 and 17.

2.1 Surfel List

Figure 6:
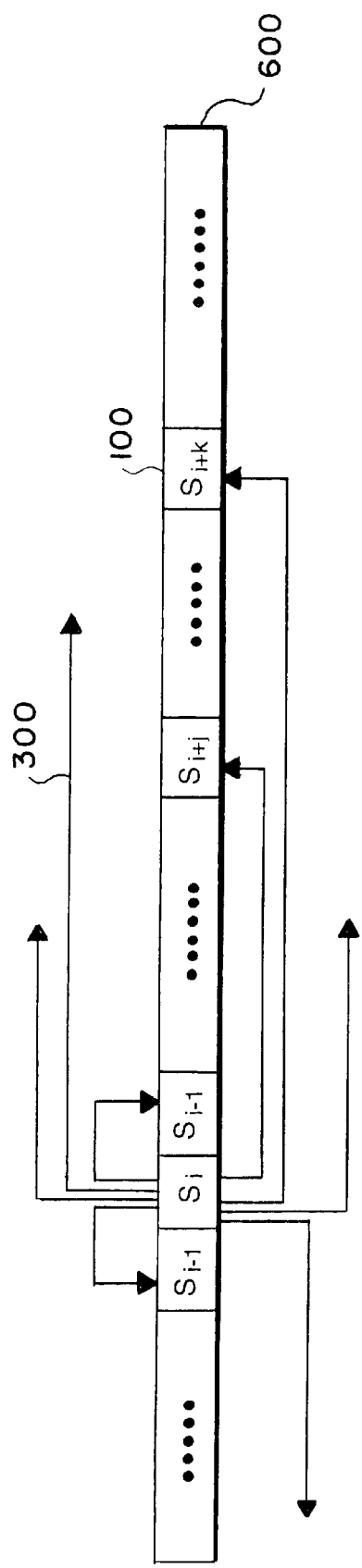
FIG. 6 is a block diagram of a surfel list.

As shown in FIG. 6, we organize the surfel data as a sequential list 600 in order to minimize traversal during processing. In the list 600, two adjacent surfels in the list are adjacent in the surfel object. To generate the list 600 we begin at some surfel $S_0$. Starting with surfel, $S_0$, as a "first" surfel at position (x, y), each adjacent surfel is added to the list, ending with the last surfel, $S_n$. We access the surfels in the list 600 by offsets. An offset is the difference vector between two surfel positions.

The offset to a previous surfel is stored in order to provide the ability for fast projection of surfers. If the offset is stored, then the need to calculate the view coordinates of each surfel using the viewing matrix can be omitted. By storing offsets, the surfels can be stored as a sequential list or array. Surfels that are adjacent in the list, are also adjacent in the object.

Because the surfels are 8-connected, the offsets are either $\{\pm1,0,0\}$, $\{0,\pm1,00\}$, or $\{0,0,\pm1\}$ when the surfels are positioned at pixel spacing. The offsets can be pre-calculated for a particular view, and can be stored in a lookup-table. Object coordinates of surfels can be generated by adding offsets to previous surfel positions in the linked list 600.

Which surfel is chosen first can depend on the object. For instance, for a sphere, the first surfel can be on the "top" of the sphere, and the list "wraps around" the sphere. It should be noted that "left" and "right" adjacent surfels may also be adjacent in the list, however the "up" and "down" adjacent surfers might be located anywhere in the sequential list. In case the adjacent surfels in the list are not adjacent in the object, the surfels might be located anywhere in the list 600.

Because surfels are defined as zero-dimensional points in a six sided "cell," i.e., a 3D grid with pixel-sized spacing, the offset between the cells of adjacent surfels will be the same for many surfels. To speed up a projection to the image plane, each offset is transformed to a screen-space offset only once, and is then stored in a lookup-table. The look-up table can be precomputed. During projections, each view coordinates of each surfel can be found using table lookup.

3. Generating Surfels and Surfel Objects

To generate surfels and surfel objects, we describe a number of possible methods.

3.1 Synthesis

Synthesis from implicit surfaces can typically be used for objects such as spheres, planes, and cubes, or other objects that can be defined analytically. Generating synthetic surfel objects according to our data representation should be apparent to one of ordinary skill in the art after a detailed examination of the data structures that we described herein. The key concept is that the synthesis of the surfers is at an image plane resolution, and adjacent surfels are connected by links.

3.2 Conversion

Arbitrary geometric objects, such as polygons require conversion to generate polygons. We call this process conversion.

Figure 7:
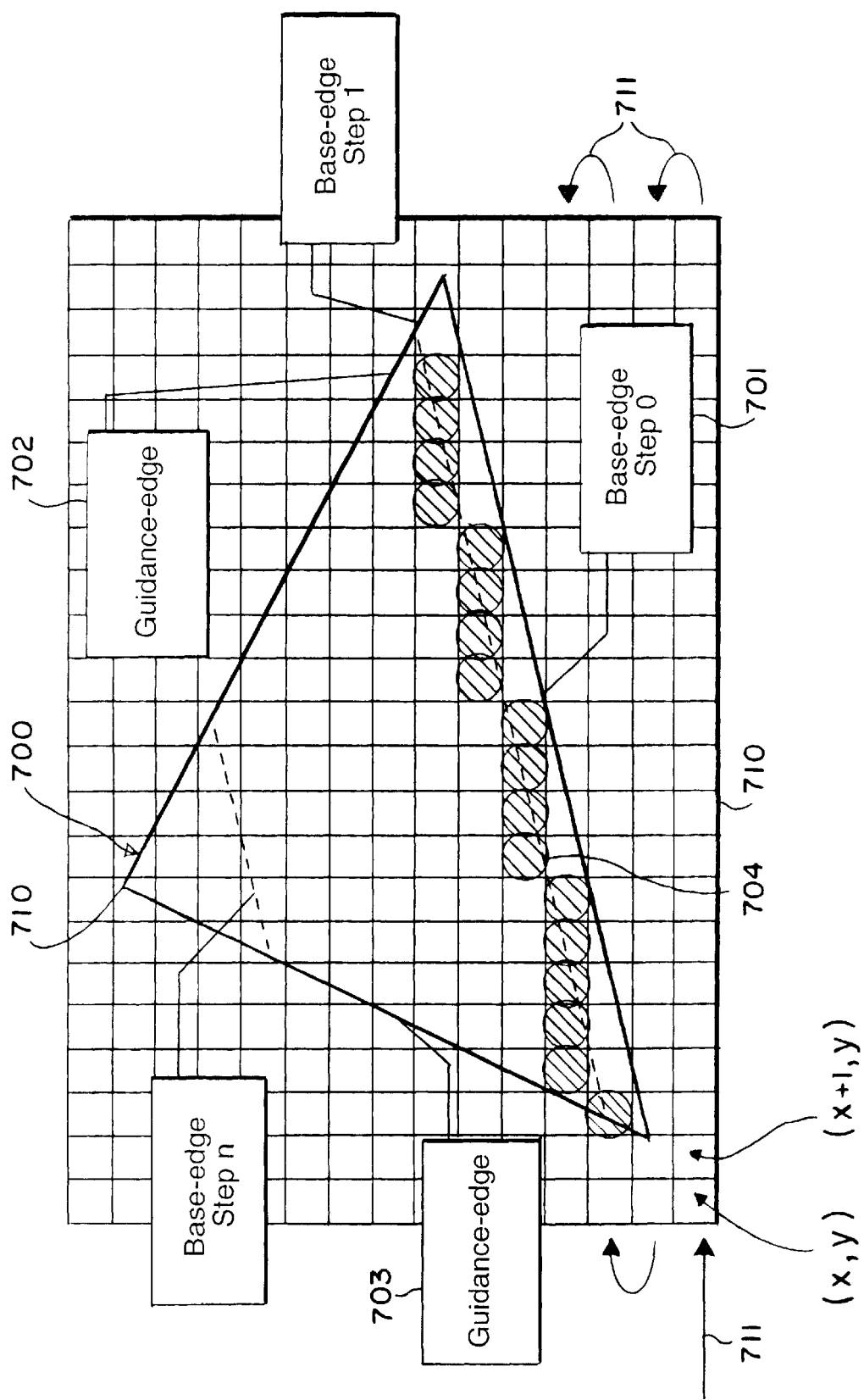
FIG. 7 is a polygon for scan-converting a polygon to surfels.

FIG. 7 shows the order in which surfels can be generated for a single 2D plane 710 starting at a grid position (x, y), followed by (x+1, y), and so forth. The arrows 711 show the order of generating, back and forth, row by row using alternating directions for adjacent rows. The first row will start generating surfels from left to right. The surfels in the next row will be generated from right to left. This ordering keeps the offset of each surfel within the unit steps for each direction. The surfels are generated for the list 600 sequentially, and the offsets between the cells of adjacent surfels is either (1, 0, 0), or (0, 1, 0) in x, y.

3.2.1 Conversion Using a 3D Digital Differential Analyzer

A 3D scan-conversion can be used to convert a prior art polygon object to a surfel object according to our invention. We have adapted a method as described by Kaufman et al. in "3D Scan-conversion Process for Voxel-based Graphics," Proceedings of the 1986 Workshop on Interactive 3D Graphics, Crow. F., Pizer. S.M. (eds.), pages 45–75, 1986. Kaufman's method converts polygons to voxels. Kaufman uses an algorithm that draws circles parallel to a major plane. Circles are drawn in two regions, equatorial and pole regions, while symmetry is used to simplify the algorithm by generating both hemispheres simultaneously. In contrast, we convert polygons to six adjacent 8-connected surfels stored in a sequential list.

Our 3D scan-conversion of polygons uses the 3D scan-conversion of lines for the edges of the polygon. The surfel runs between the edges are filled to provide optimal connectivity. Our method requires that polygon edges are sorted in y, because the scan-lines are parallel to the y-coordinate axis.

The DDA-process was originally developed to rasterize lines on a 2D display. For a particular line, the pixel positions of the begin- and end-point, and $\Delta x$ and $\Delta y$ are calculated. The $\Delta x$ and $\Delta y$ are then divided by the biggest of the two deltas, and the number of steps the process takes is set equal to this biggest delta. For each step in the direction of the biggest delta, a pixel position is calculated according to the delta in the other direction. This process is simple and efficient.

As shown in FIG. 7, the DDA process is applied to a polygon 700 as follows. One of the three edges of the triangle 700 is chosen as the "base-edge" 701, while the remaining two edges 702 and 703 are chosen as "guidance-edges," A line 704 parallel to the base-edge is 3D rasterized every time the process takes another incremental step along the guidance-edges.

Our process is different from Kaufman's algorithm because our base-edge can be arbitrarily oriented in 3D. In Kaufman's algorithm, the base-edge is always parallel to the y-coordinate axis, unless the polygon is coincident with the xz-coordinate plane, in which case the base-edge is either parallel to the x or z-coordinate axis.

A polygon surface normal is calculated to detect whether polygons are parallel with planes spanned by the major axis. In this case, certain optimizations can be performed for the process.

For the base-edge 701, the values of $\Delta x$, $\Delta y$, and $\Delta z$ are calculated and the maximum of those three deltas is determined, $\Delta_{max}$. A total of three increments are calculated, 1) $x_{incr} = \Delta x / \Delta_{max}$, 2), $y_{incr} = \Delta y / \Delta_{max}$, and 3) $z_{incr} = \Delta z / \Delta_{max}$.

Taking a step in the direction of the maximum delta along x, y, or z, results in a sample position in 3D along the base-edge. To scan-convert the triangle 700, the deltas in x-, y-, and z-direction of the two guidance-edges are determined as well. Again a total of three increments per edge are calculated, but this time the deltas are divided by the maximum delta of both guidance edges. The reason for this is to guarantee that the steps along the guidance-edges will maintain the orientation of the base-edge for each of the parallel edges that will be scan-converted.

After each incremental step along the two guidance-edges, a 3D rasterization of the edge parallel to the base-edge is performed. Each incremental step along the guidance edges results in a decrease in length of that edge. At each sample position found during a 3D rasterization of the edge, a surfel is stored for that position.

Figure 8:
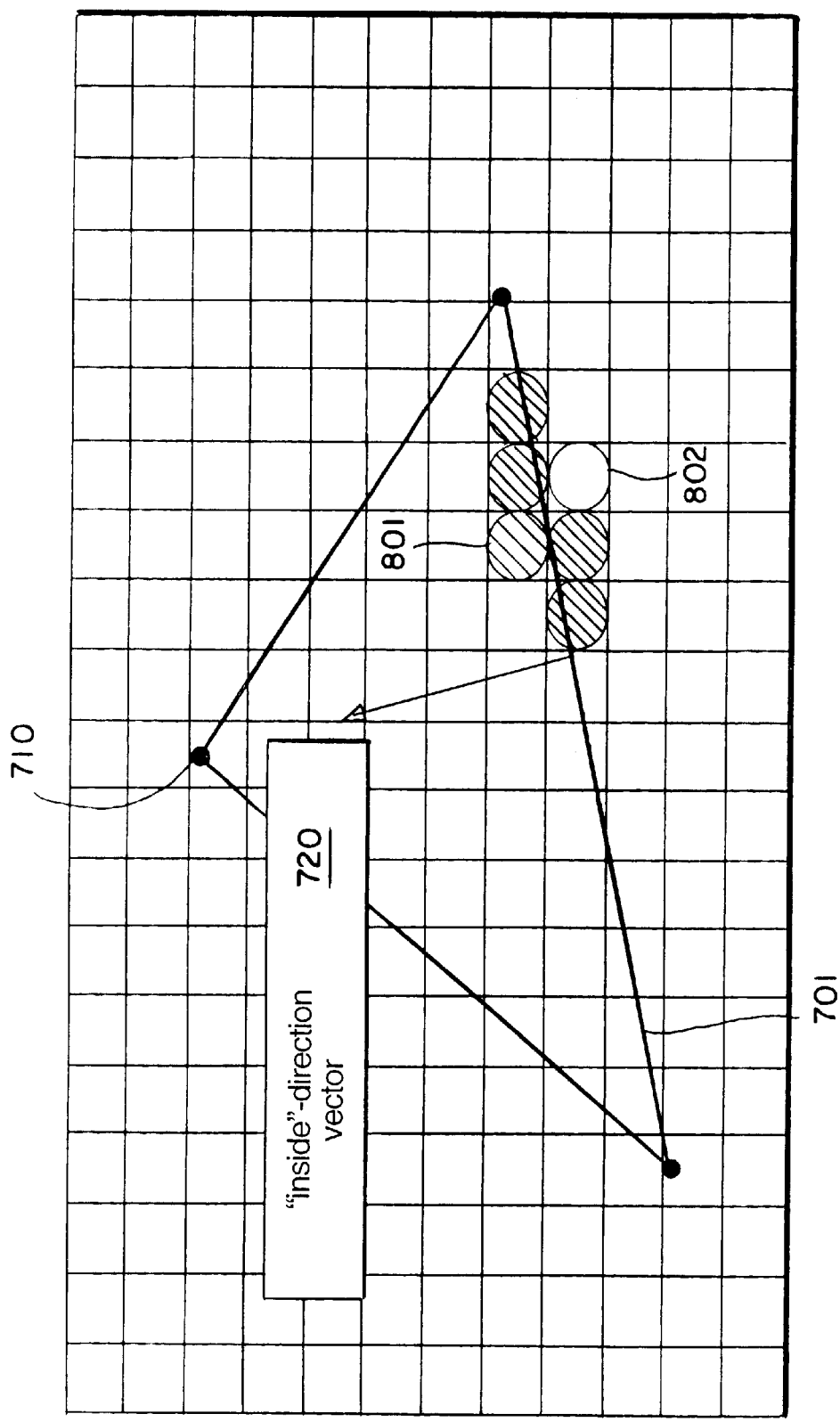
FIG. 8 is a polygon with inside and outside surfels.

As shown in FIG. 8, surfels that are added to provide 8-connectivity are only added to the inside of the triangle 700. In FIG. 8, either surfel 801 or 802 can be added to the list 600. To determine which surfel is inside, the position of vertex 710 relative to the base-edge 701 is determined. This can be accomplished by defining an inside-direction vector 720 pointing to vertex 710, and perpendicular to the base-edge. According to the inside-direction vector 720, one of the two candidate surfers is selected, in this example, surfel 801.

Every time a surfel is added to the sequential list, its position is stored in a hash-table according to its position. Before surfels are added, a check is performed on the hash table to determine whether a surfel at that position already exists.

3.2.2 Conversion Using Distance Maps

In the prior art, distance maps have been used to accurately represent surface voxels in sampled volumes. A distance map for a volume is itself a 3D volume. For each grid position, the distance map stores the smallest distances to the surface of an object. These distances can either be calculated from an analytical description, or extracted from binary segmented data in a volume.

A distance map has properties that provide for the accurate reconstruction of an object's surface from the volume. The gradient of the distance map yields the direction of the surface normal. The sign of the distances differentiate the inside and the outside of the volume. The surface of the object is located at a zero-distance in the distance map. The distance map varies smoothly across the objects surface, avoiding high spatial frequencies, and thus allowing surface reconstruction using relatively low-cost reconstruction filters.

Figure 9:
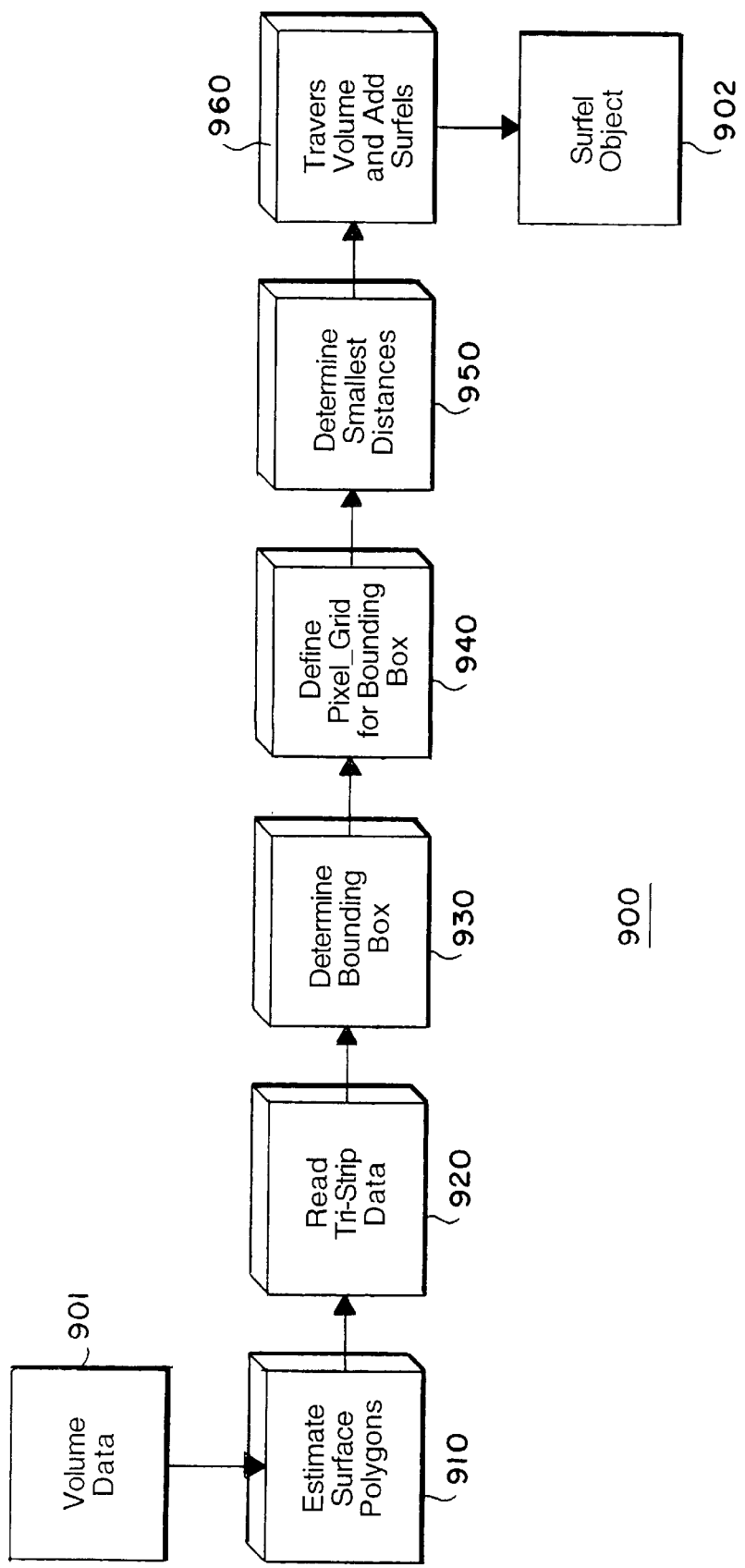
FIG. 9 is a flow diagram of a surfelization process using distance maps.
Figure 10:
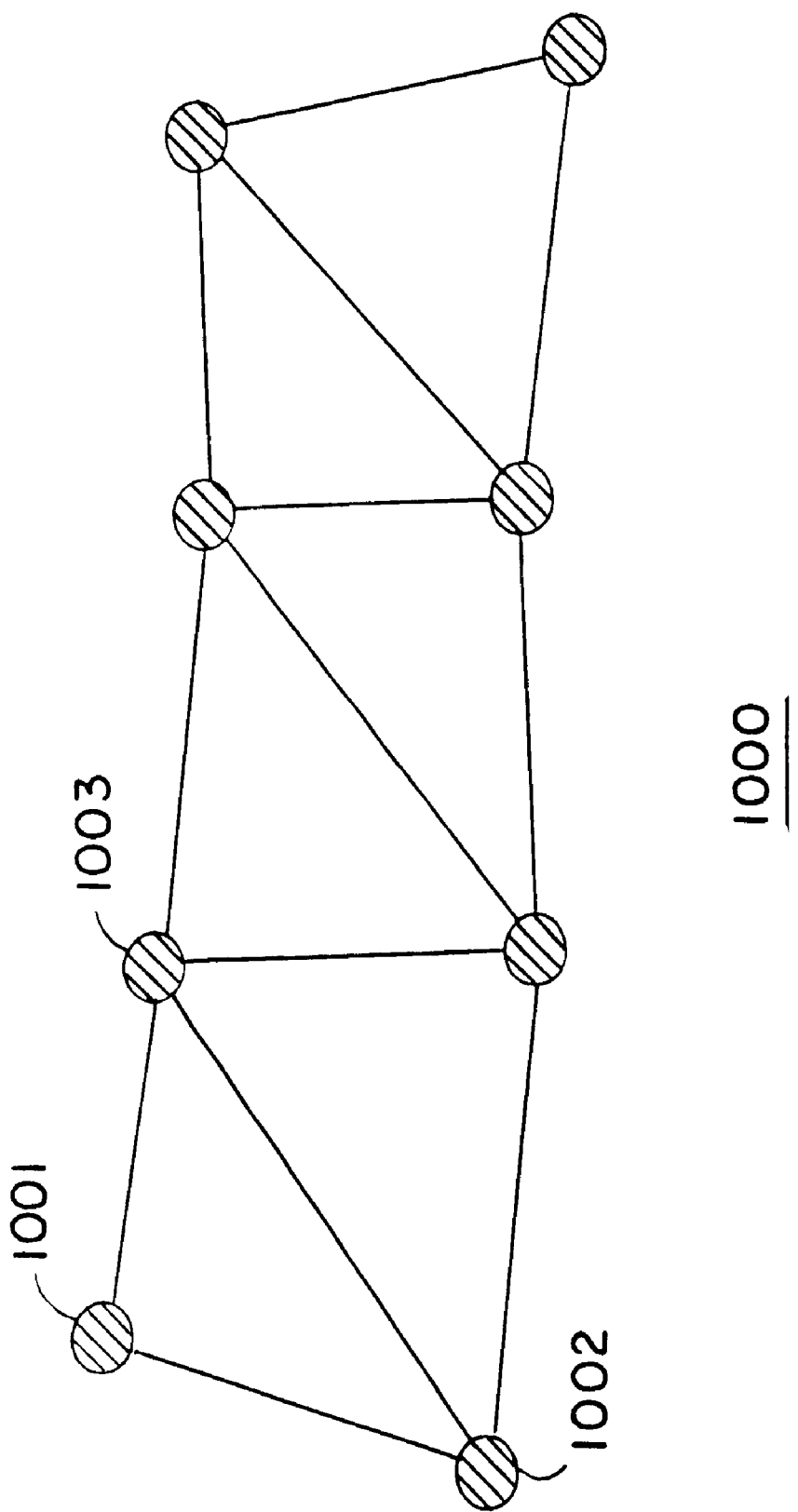
FIG. 10 is a tri-strip of polygons.

FIG. 9 shows the steps for a process 900 to surfelize an object using distance maps. In step 910, surface polygons (e.g., triangles 1000 as shown 20 in FIG. 10), are estimated from sampled volume data 901. The polygons 1000 can be stored using tri-strips. Each polygon in a triangle mesh consists of three vertices, e.g., 1001–1003. To store n triangles, n+2 nodes are required.

In step 920, the tri-strip data are read, and a bounding box for the tri-strip is determined in step 930. A volume with pixel-sized spacing is defined around the tri-strip according to the bounding box in step 940. The dimensions of the volume are slightly larger then those of the bounding box in order to prevent tri-strips from being coincident with any of the boundaries of the volume. This condition allows one to determine where the surface of the object is located, which will be described further below.

In step 950, the smallest distance to the triangles for each integer grid point position of the volume is determined as described in detail below. In step 960, one traverses the volume and adds surfels for those grid points that contain a distance equal or smaller than $\frac{1}{2}\sqrt{2}$. This is half times the face-diagonal of a cell that contains a surfel. We choose a $\frac{1}{2}\sqrt{2}$ scaling factor to avoid producing holes as described in greater detail below.

Distance Calculations

Figure 11:
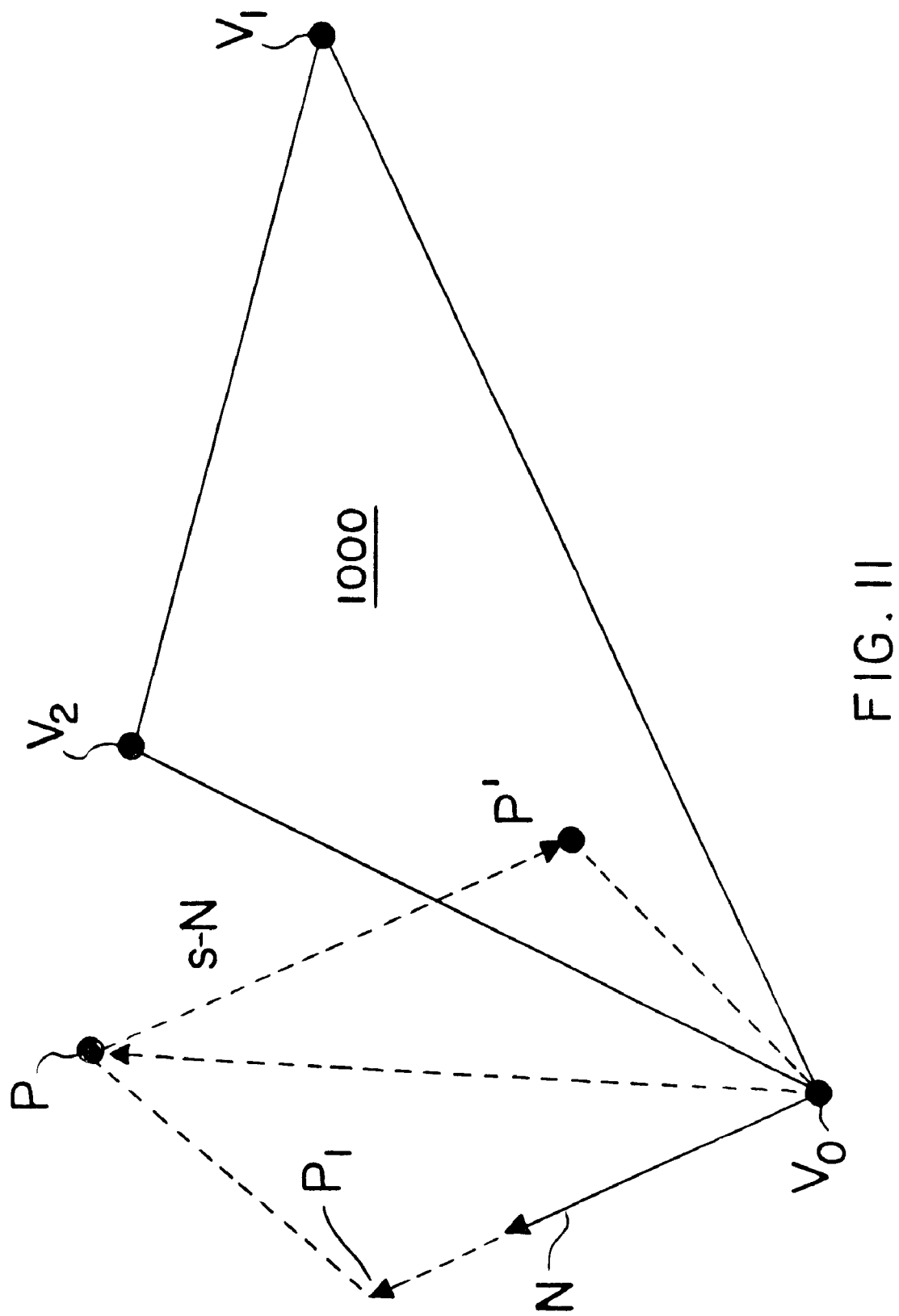
FIG. 11 is a graph showing projected distances.

To calculate a distance for each triangle in the tri-strip 1000, a sub-volume (enlarged bounding box) that is part of the larger volume is defined around the triangle as stated above, see also FIG. 11. For each grid position of the sub-volume, the distance to the triangle is calculated. The method calculates the 3D closest distance from point P to a triangle 1100 with vertices $V_0$, $V_1$, $V_2$, and a normal N.

To calculate the 3D distance from the point P to the triangle, one determines whether the perpendicular projection of point P onto the plane defined by the planar triangle is inside the triangle or not. If the projection of P is outside of the triangle, then the 3D closest distance is the magnitude of the vector from P perpendicular to one of the edges or vertices. If the projection of P is inside the triangle, then the 3D closest distance is the magnitude of the vector from P to its projected point P' in the triangle. To determine the projection of P onto the triangle's plane, P is projected onto the normal N by calculating the dot product of $P_1$ and N. The projected vector is subtracted from P yielding the projected point P'.

Figures 12A, 12B:
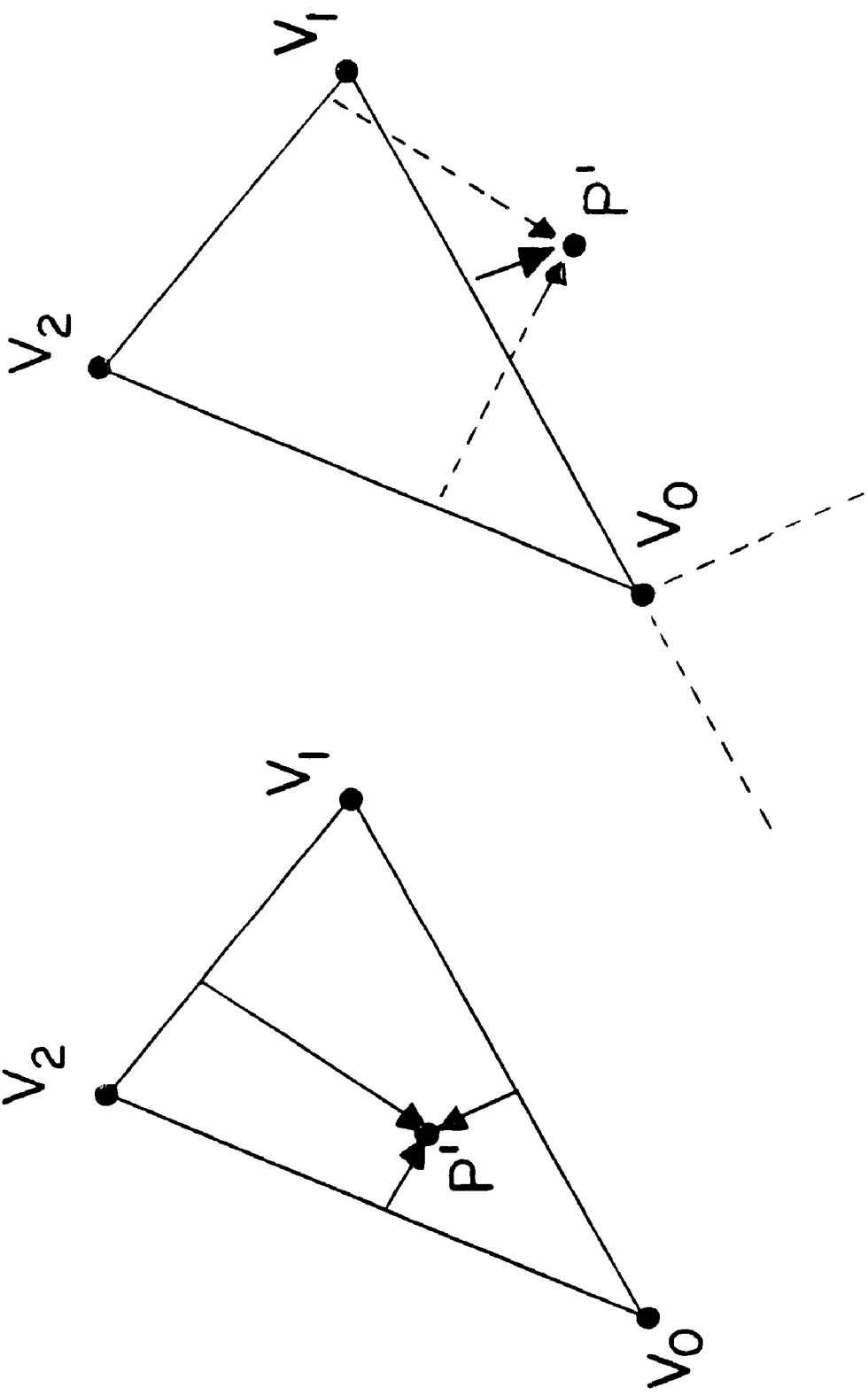
FIGS. 12a and 12b are graphs for inside and outside projected points.

FIGS. 12a and 12b show the 2D projection of the triangle 1100. The projected point P' is inside the triangle in FIG. 12a. All the vectors perpendicular to the edges also point inside for this case. In FIG. 12b, the vector perpendicular to edge $V_0V_1$, represented with the bold arrow, points outside, whereas the other two vectors point inside. The figure also shows that P' is closest to the edge $V_0V_1$. For the 3D case, this will be determined as follows.

The vectors $PV_i$ and $V_jV_i$, where $V_j$ is the endpoint of an edge, and $V_i$ the begin-point, define a plane for which a normal N' is determined. This normal will point 'towards' the inside of the triangle if P' is inside, otherwise the normal will point away from the triangle. This can be detected using the sign of the dot product of the triangle normal N and N'. Appendix A details the steps as C-style pseudo-code for this calculation.

The distance calculations are performed for all of the grid positions of the sub-volumes, for each triangle in the strip, and for all the triangle-strips of the object. Since sub-volumes will overlap, some positions may have multiple distances calculated. In this case, the smallest distance is used.

The surface object is located at the positions where the distances are zero. This zero distance might be somewhere within the cell that is bounded by eight grid positions. So when traversing the volume, surfels are added whenever an absolute minimum in distance is encountered in the volume. This is why the object should not coincide with any of the boundaries of the volume. To guarantee that surfels will be added in 8-connectivity, for each grid position that is distance $\frac{1}{2}\sqrt{2}$ or closer to the surface, a surfel will be added.

Figure 13:
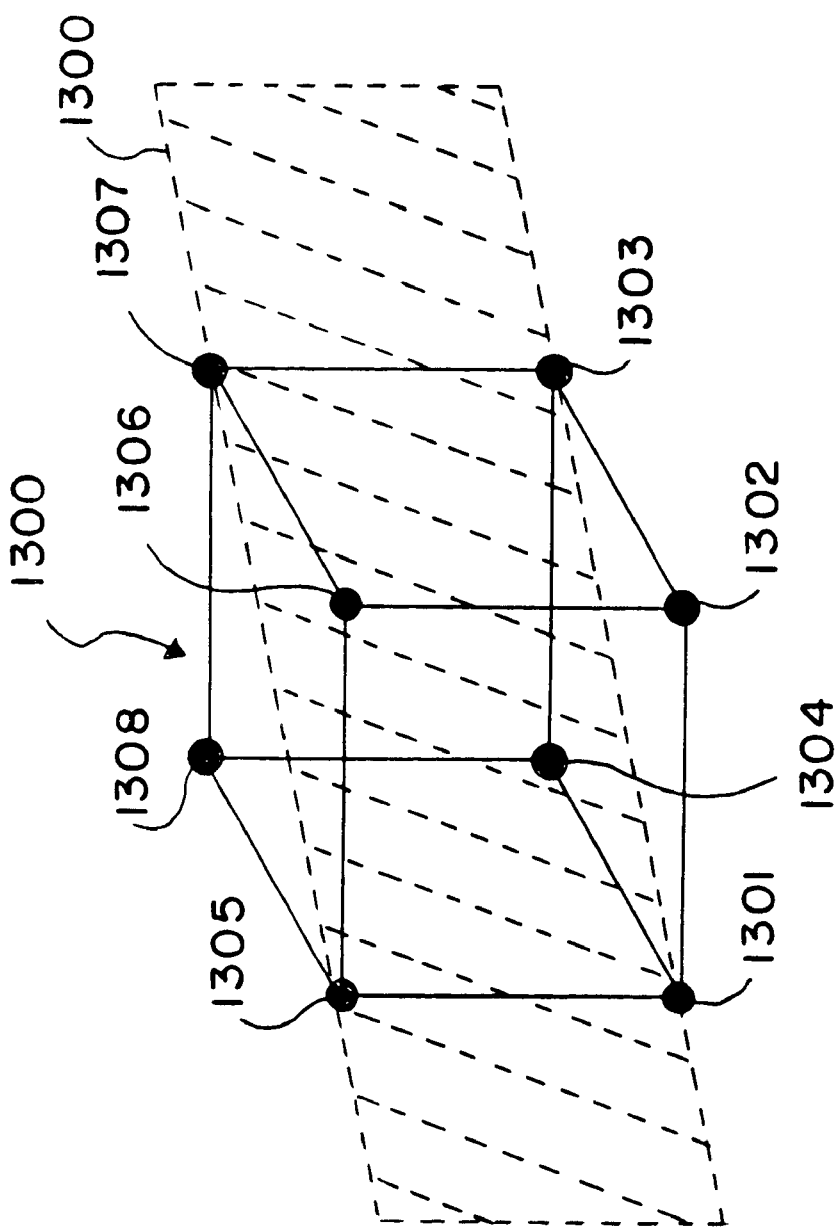
FIG. 13 is a graph of a surfel cell partitioned by a planar surface.

FIG. 13 illustrates the reason why we choose the $\frac{1}{2}\sqrt{2}$ value. Consider a six-sided cell 1300 in the volume bounded by eight grid points 1301–1308. The cell 1300 is partitioned diagonally by an object surface 1310 that just misses the diagonal (odd) grid points. In other words, the distance at the diagonal grid points is almost, but not exactly zero. Surfels need to be generated at these positions. However, these surfels are not 8-connected, and hence, additional, either at even positions 1302 and 1306, or positions 1304 and 1308 surfels must also be generated. For example, if the surface cuts through the cell "left of" the odd grid points, then the distance in the grid points 1304 and 1308 is a little less than $\frac{1}{2}\sqrt{2}$, and for these positions surfels are added to provide 8-connectivity.

However, if the surface exactly cuts through the odd grid points, and the distance at those points is zero, and the distance for the even grid points is $\frac{1}{2}\sqrt{2}$, then surfels need to be added at all eight grid points. This is the worst-case. If this is the case for the entire surface of the object, then the resulting surface has a certain thickness, e.g. the length of a face-diagonal of the cell: $\frac{1}{2}\sqrt{2}$.

3.3.3 DDA compared to Distance Maps

The advantage of the 3D DDA surfelization is its simplicity. The process can be implemented with integer arithmetic to calculate new positions along a line. Surfelization using distance maps is more complex and also more memory intensive. The volumes that are used to calculate distances have to be stored in memory during surfelization. These volumes can become quite large.

Although conversion using distance maps requires one to calculate the distance to a triangle for every integer grid position, a cell of the volume will never be traversed more than once, omitting the need to check whether a surfel already exists. This check is needed for conversion with 3D DDA.

As stated above, to efficiently traverse the list of surfels for rendering, we store the surfels sequentially in the list 600. Applying the 3D DDA process results in a sequential list of surfels for each triangle by simply alternating the direction of scan-conversion with each incremental step from "left-to-right" to "right-to-left". With surfelization using distance maps, the order in which the surfels are added to the list is according to the order in which the volume is traversed, which is slice by slice, and surfels within each slice.

Figure 14:
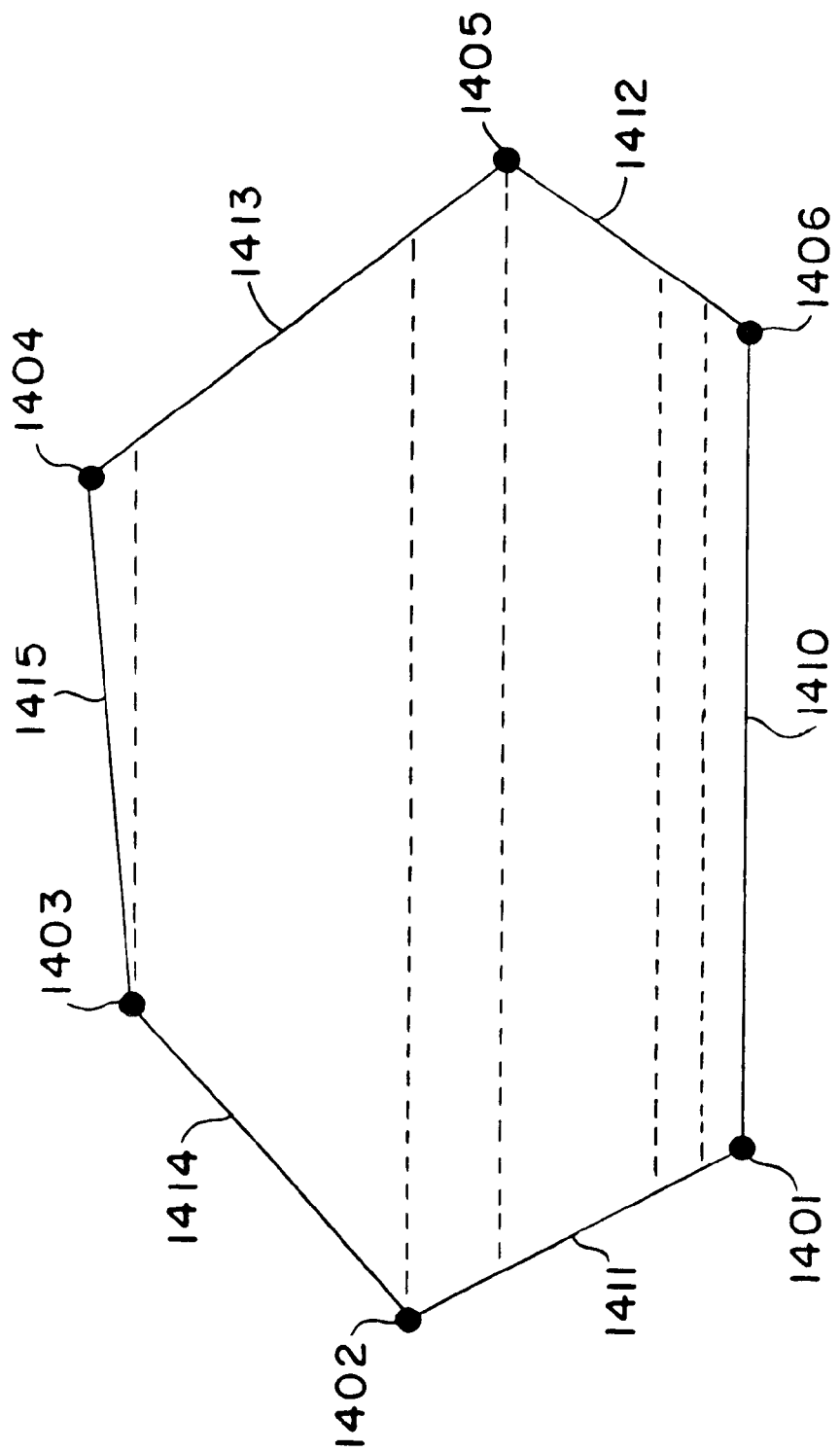
FIG. 14 is a graph of an arbitrary polygon to be surfelized.

FIG. 14 shows how the 3D DDA process can be extended to surfelize an arbitrary polygon 1400, as long as the polygon is convex. To reach this goal, the vertices 1401–1406 of the polygon are arranged in some order, for example, clockwise. A base-edge 1410 and two guidance-edges 1411–1412 are chosen. When the surfelization line reaches vertex 1405, guidance edge 1413 replaces edge 1412. Similarly edge 1414 replaces edge 1411 when vertex 1402 is reached, and finally edge 1415 is used.

Distance maps can also be used with arbitrary convex polygons. The same process to calculate the 3D distances for triangles can be applied. This introduces the extra cost of checking the grid position against more edges and vertices to determine the closest edge or vertex.

3.3 Extracting Surfels from Voxels

Surfels can be generated from a volume data set as follows. In a first step, the voxels are resampled to the resolution of the image plane. Second, voxels on a surface boundary of the object are extracted, and the extracted voxels are then converted to point samples or surfers. Third, 6-adjacent surfels are connected by links. This step may require the extraction of additional voxels to provide 8-connectivity. In a last step, any gaps in a surface due to lacking volume data can be filled by interpolation.

3.4 Mapping a Particle Cloud to Surfels

A particle cloud can be mapped to surfels as follows. First, a grid at the screen resolution is placed around the cloud. Each cell is examined. If the cell contains exactly one particle, the particle can be directly mapped to a surfel. If a cell contains more than one particle, the particles need to be merged to a single surfel. If a cell contains no particles, a surfel needs to be interpolated from particles in adjacent cells.

3.5 Generating Levels of Detail

The surfel representations can be at different levels of detail to facilitate "zooming," i.e., changing the distance between the image plane and the object during projection. After, or while surfels are generated, a filter can be applied to generate different levels of detail. Typically this is done as a pre-processing step before rendering. Filtering and down-sampling can generate lower (coarser) resolution surfel objects, upsampling and filtering can generate higher (finer) resolution surfel objects. For example, the values attributed to the four adjacent surfels 100 shown in FIG. 2a can be averaged into a surfel of a lower level of detail object. Other filtering or sampling techniques can be applied to different combinations of surfels to provide the various levels of detail, e.g., 16, 4, 1, $1/4$, $1/16$, $1/256$, and so forth.

4. Physically-Based Modeling of Graphic Objects

In physically-based realistic simulation of interaction between graphical objects, two types of modeling are typically used: rigid body mechanics, and dynamic deformation.

With rigid body mechanics, graphical objects stay rigid while they are subject to external forces or torque. Parameters such as position, orientation, velocity, center of mass and inertia factors are used to simulate the path of the objects through space and time according to Newtonian mechanics. As a characteristic of rigid body mechanics, the shape of the objects remains unchanged at all times.

Furthermore, the mechanics can be constrained or unconstrained. In constrained rigid body mechanics there can be interactions between objects, e.g. collisions. In unconstrained rigid body mechanics, the objects move independent of the movements of other objects.

With dynamic deformation, objects are subject to internal and external forces using mass, position and velocity of potentially every surface element in the object. We use a mass-spring system to apply physically based modeling of dynamic deformation to surfel objects. The surfers are point masses, and the links connecting the surfers act as springs to model realistic physical behavior of the masses.

4.1 Rigid Body Mechanics with Surfel Objects

Simulation of physically based mechanics of rigid bodies deals with the behavior of objects as they would behave in the real world according to the laws of nature. We mimic realistic behavior when objects are subject to forces such as gravity and torque. When the behavior is unconstrained, surfel objects are completely free to move anywhere without being concerned by collisions with other objects. We also extend this model to handle constrained rigid body simulations, such as, collisions.

Figure 15:
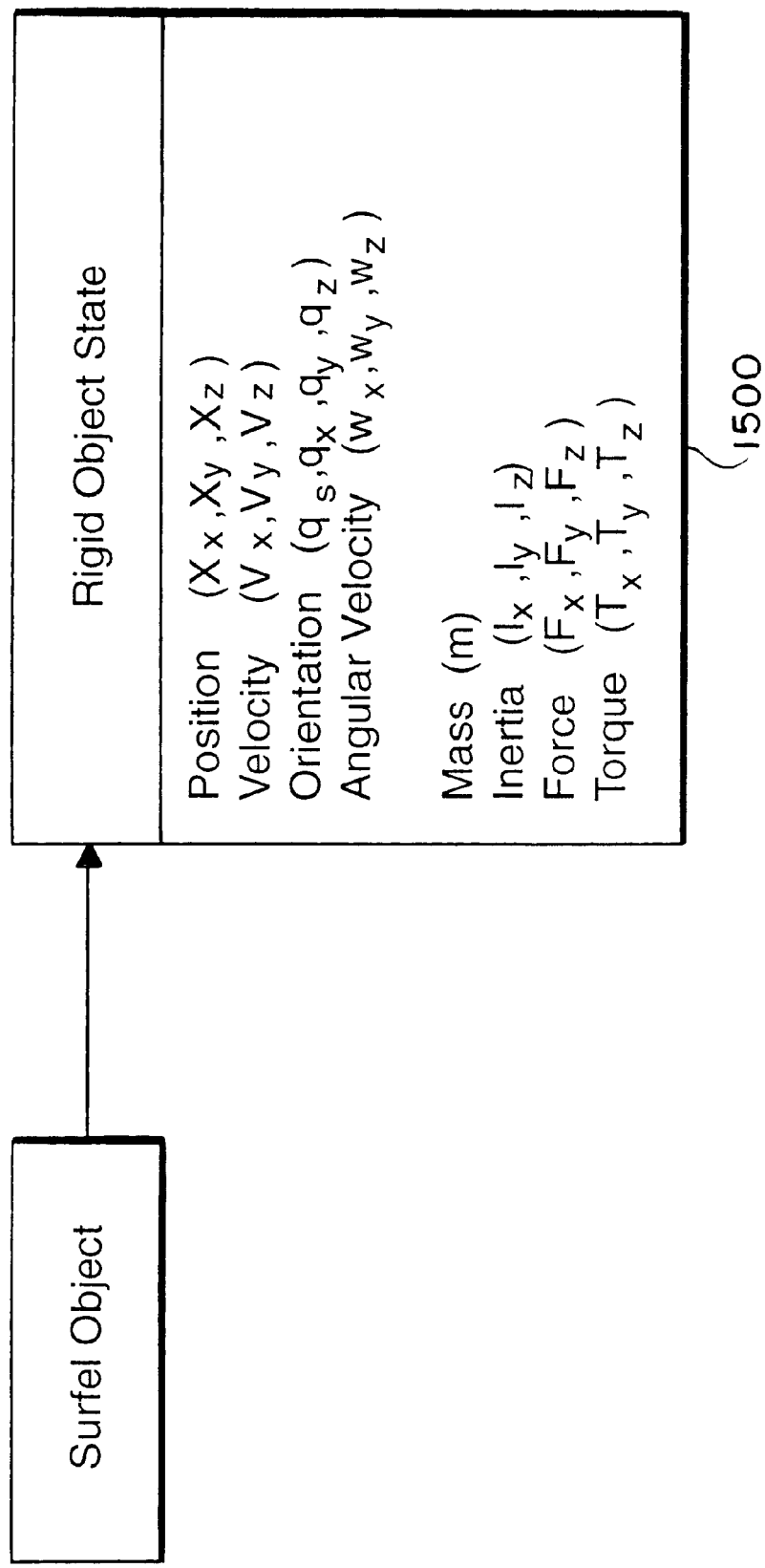
FIG. 15 is a block diagram of rigid body states.

We perform rigid body mechanics on surfel objects using a rigid body state as shown in FIG. 15.

Position and Orientation

We describe the position of a rigid surfel object, at some time t, as a vector x(t): (x,y,z). This vector specifies the translation of the object from the origin of a "world space" coordinate system to a current position of the object. The orientation of the object is defined by a tuple of four variables called a "quaternion." This tuple reflects a rotation matrix R(t), a 3×3 matrix, which rotates the object about the three axes of its own local coordinate system. The equation $$p(t)=R(t)p_0+x(t)$$

defines the position of a point $p_0$ on the surface of the rigid surfel object in its local coordinate system to a point p in the world coordinate system.

We use quaternions instead of ordinary rotation matrices. A quaternion is a list of four numbers written as $q(t)=(q_s, q_x, q_y, q_z)$. We divide the quaternion into a real part $q_s$, and a imaginary (x,y,z). We use quaternions for two reasons.

First, quaternions require only four variables, instead of nine for rotation matrices, so the size of the state vector is smaller, and fewer computations are required. Second, because we numerically integrate the state vector to advance the solution over time, the variables are subject to numerical drift, which means numerical errors accumulate. Quaternions experience far less drift than rotation matrices. Also, because the magnitude of a quaternion is normalized, we can easily recover the error by renormalizing the quaternion.

Quaternions have other advantages. Splitting the quaternion into real and imaginary parts helps to identify the rotation angle and axis. Quaternions are normalized, which means that its magnitude is equal to one. The imaginary part defines an axis about which the object is rotated. The rotation part is presented in radians. For example, a rotation of Θ radians about a unit axis u is represented by:

$$\cos(\Theta/2), \sin(\Theta/2)u.$$

Quaternions are used during numerical integration. When we need the actual rotation matrix for rendering, we transform the quaternion to the rotation matrix. We transform the matrix back to a quaternion when we need to solve a set of differential equations using integration.

Velocity and Angular Velocity

The position of the object over time depends on its velocity. We determine the velocity of the object by taking the derivative of x(t).

$$v(t)=x'(t)=dx/dt$$

If the orientation of the surfel object is fixed, then the movement of the object through world space is due to its linear velocity. If the object is rotated, we determine the analogous parameter for q'(t) as we found x'(t).

We call $\omega(t)$ the angular velocity of the surfel object, $\omega(t)$ is a vector which direction gives the axis about which the surfel object is spinning. The magnitude of $\omega(t)$, $\omega(t)$ specifies how fast the object spins. The derivative q'(t) of q(t) is found by generating a quaternion out of $\omega(t)$ by taking the imaginary part as $\omega(t)$ and add a zero value real part:

$$q_w(t)=(0,\omega_x,\omega_y,\omega_z),$$

$$q'(t)=½\, q_w(t)q(t)$$

Where $q_w(t)q(t)$ is the multiplication of the quaternions $q_w(t)$ and $q(t)$.

Taken together, position, orientation, velocity and angular velocity comprise the state vector for rigid body simulations. The state vector contains a total of thirteen variables:

$$x(t)=q_s,q_{xq\nu},q_z,x_x,x_\nu,x_z,v_\nu,v_z,\omega_x,\omega_\nu,\omega_z.$$

These thirteen variables are updated every time step during integration. When we construct the differential equation which describes the behavior of a surfel object, i.e., the values in the state vector over time, we can solve this equation by using numerical integration:

$$x'(t)=f(x,t)$$

where the function f computes the derivative of x(t). The function f describes the state of state vector x after time t. Once we know the function f, we can derive the new position, orientation, velocity, and angular velocity of the surfel object in world space. In order to solve functions, we compute the derivative of the state vector x.

Other Quantities

We use some additional state variables to compute x'(t) from x(t). We calculate a new velocity of the surfel object when the object is subject to acceleration. Example forces are gravitational force or forces that result from user input. For the velocity v equals the acceleration a, we use:

$$F=ma \text{ or } a=F/m$$

To calculate the acceleration a, we need to know the mass of the surfel object. Because the mass of the surfel objects does not change during our simulations, we can calculate the total mass of the surfel object by accumulating the mass of all surfels in a pre-process state of the simulation.

The equivalent of the force F for computation of angular acceleration is torque. Torque acts on a object to make it rotate. When this force is aligned with the center of mass, nothing happens, but as soon as the force is applied to a point anywhere else on the object, the force will cause the object to rotate.

To compute the angular acceleration, we use the derivative of the angular velocity. We use an entity analogous to mass to determine the angular acceleration from the torque T(t) that is acting on the surfel object. This entity is a 3×3 matrix called the inertia tensor I(t). The tensor is usually computed before the start of a simulation because it does not change over time. The tensor describes how the mass of the surfel object is distributed along the volume of the object. In practice, this 3×3 matrix can be deduced to a vector of 3 entries.

To derive an expression for the angular acceleration, we use angular momentum L(t):

$$L(t)=I(t)\omega(t)$$

And its derivative:

$$L'(t)=T(t)$$

to derive an expression for $\omega(t)$:

$$\omega'(t) = \frac{(T(t) - I'(t)\omega(t))}{I(t)}$$

Rigid Body Simulation

Figure 16:
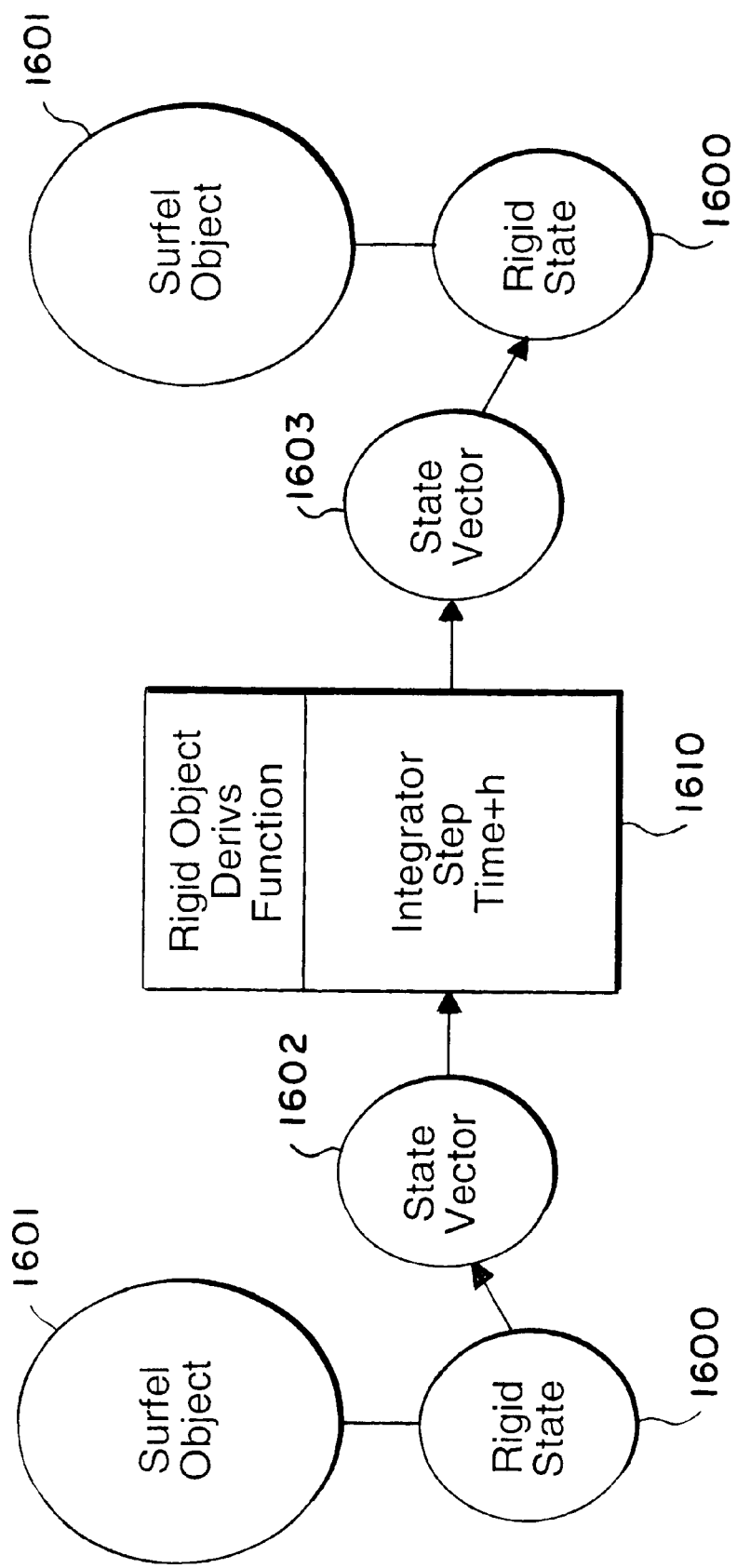
FIG. 16 is a flow diagram of a process for performing rigid body modeling of a surfel object.

As shown in FIG. 16, the rigid state 1600 of an object 1601 that is dependent on time is copied to a state vector 1602. The state vector serves as input for a numerical integrator 1610 which produces a new state vector 1603 for some time step h. The state vector 1603 is copied back into the surfel object's state 1600 so that the new position and orientation of the object in space and time is known for subsequent processing steps.

Collision Detection and Contact Forces

We now described unconstrained rigid surfel object motion. When we want objects to respond to collisions, we compute the exchange of energy and momentum between two objects according to physical laws. This results in rigid body behavior in which objects will follow a new path through space after a collision. Computed forces are not absorbed by objects, all forces will be used to direct the object in a new orientation and with a new velocity. Where material properties allow the dynamic deformation of objects, we also compute the exchange of energy because energy can be dissipated and absorbed during collision.

Collision detection between two surfel objects may require a great amount of computational overhead, because one may have to compare every surfel in one object to all surfels in the other object. To avoid this problem, we generate a polyhedron bounding box for each surfel object, for example, a 12-sided dodecahedron for a sphere. A bounding box with a reasonable amount of polygons can approximate the surface of a surfel object to some precision, and the number of polygons that need to be checked for collision can be reduced.

When we detect a collision between two surfel objects, we determine regions (polygons) of interest on the surface of the objects and start our search for the actual colliding surfers, thereby reducing the initial task of checking every surfel with every other surfel. When we have found the surfels that are participating in the collision, we can derive contact forces from the attributes in the state vector of the surfel object.

After we determine contact forces at the surfel level, we can compute the alterations of the state that results from a collision such as new velocity or orientation. Also, we can start deforming the surfel object using, for example, a mass spring system, described next.

4.2 Dynamic Modeling of Deformation in Surfel Objects

Rigid body modeling does not handle dynamic deformation of objects. When objects change their shape according to forces that act on the objects, we use a model that handles individual surfels within a surfel object. Since surfel objects are constructed from discrete point samples, the simulation of dynamic deformation of surfel objects is done by simulating the motion of every surfel in the object.

Figure 17:
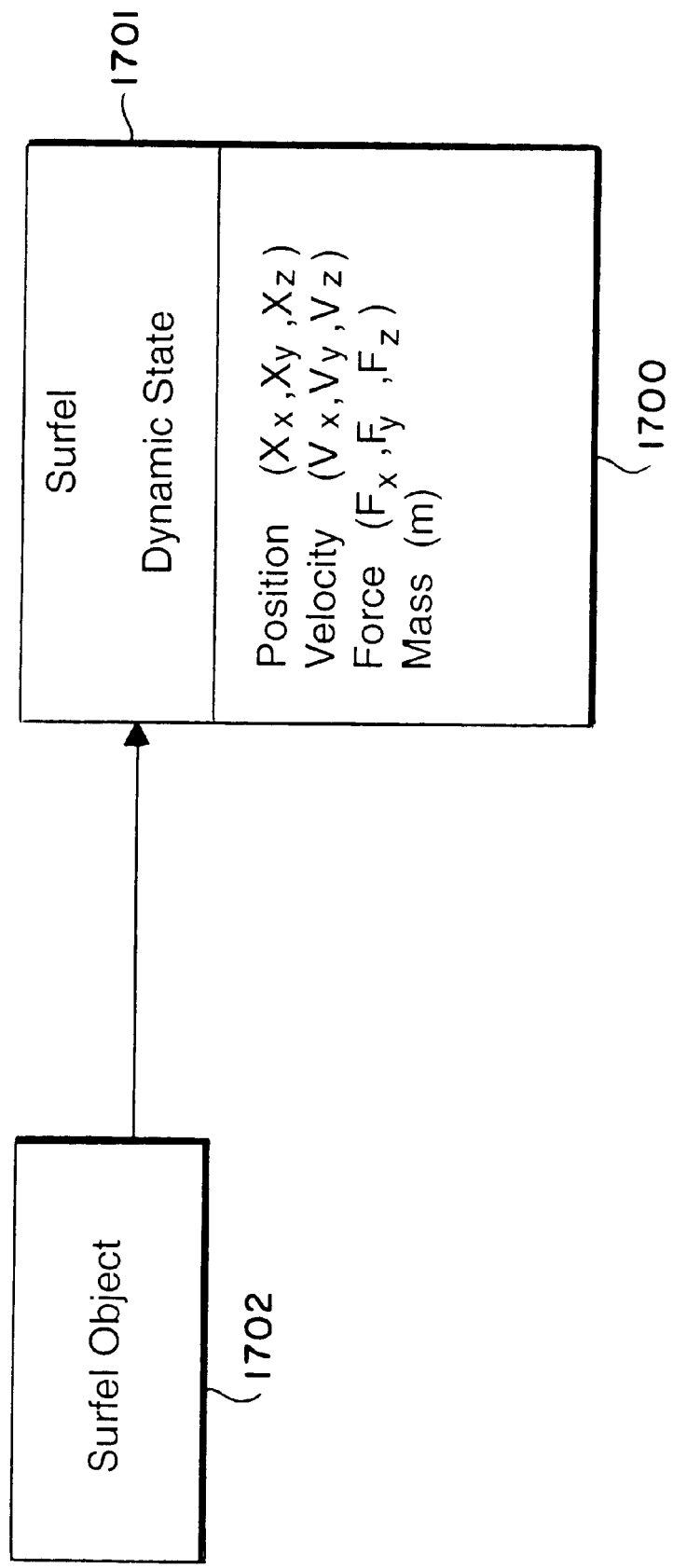
FIG. 17 is a diagram of dynamic states of a deformable surfel object.

In particular, every surfel has a position, velocity, force, and mass that acts on the surfel as shown in FIG. 17. So for every surfel we define:

$$x'(t)=v(t)$$

$$v'(t)=f/m=a$$

These are the same as for rigid body mechanics as above.

Also, analogous to rigid body mechanics, we take a snapshot of the state of a surfel object to be able to generate simulations. We generate a state vector that reflects the state of every single surfel that is present in the surfel object. As in rigid body mechanics, we feed this state vector into a numerical integrator to compute a new state vector that reflects the new state of every surfel at the end of a time interval h.

FIG. 17 shows the variables 1700 we associate with each surfel 1701 of a surfel object 1702 during the simulation of deformation. Because surfels are modeled as zero-dimensional points, there is no need to store the orientation of a surfel. The time dependent contents of the surfel state define the state vector:

$$x(t)=(x_x, x_y, x_z, v_x, v_y, v_z)$$

Forces emerge when surfels are displaced which causes a disruption in the natural distance between two surfels which is modeled by surfel links. Such displacement of surfels can be the result of collisions between surfel objects or by user input.

4.2.1 Mass-Spring Systems

Figure 18:
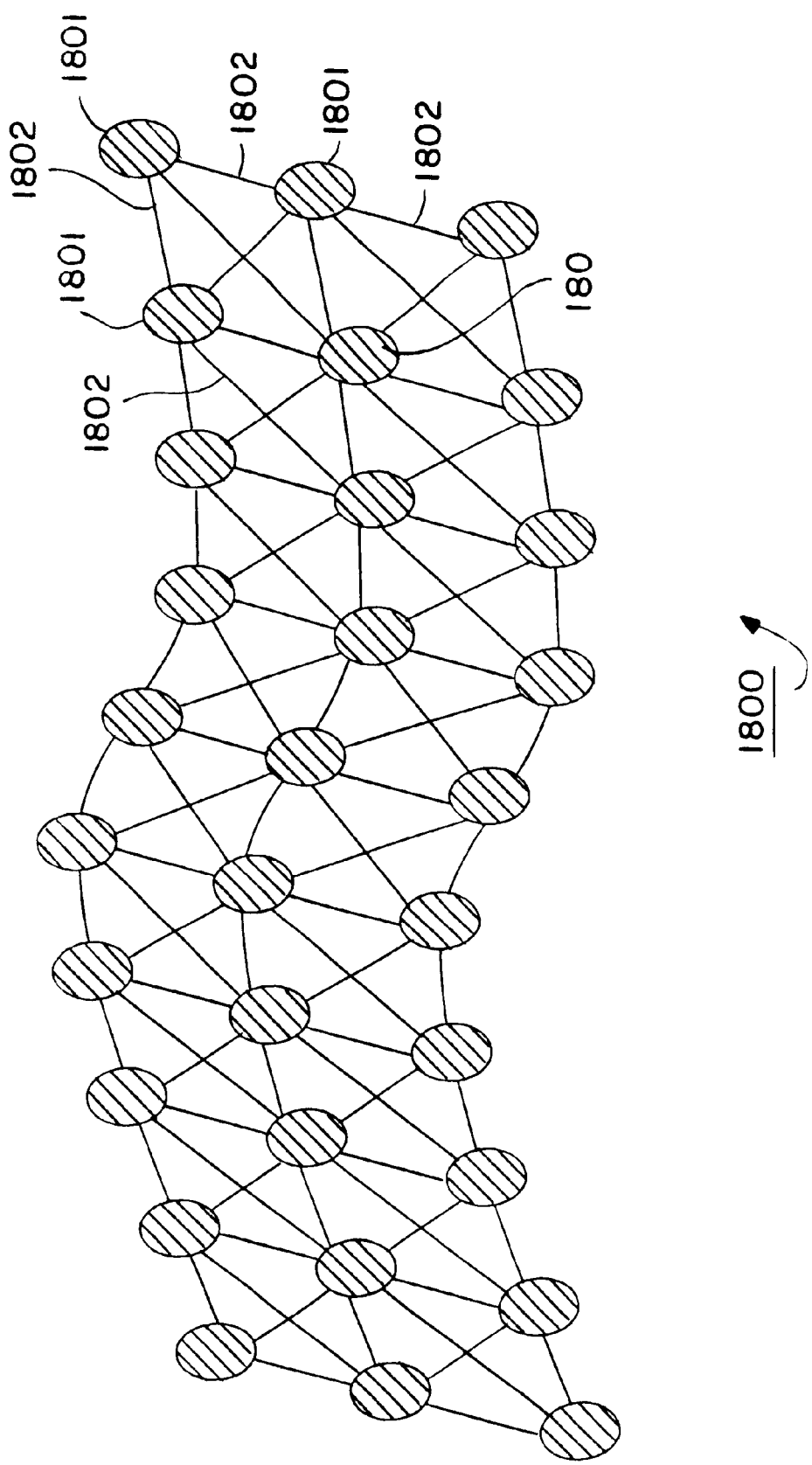
FIG. 18 is mesh of a surfel object modeled as a mass-spring system.

FIG. 18 shows a portion 1800 of a surfel object modeled as a lattice of surfers 1801 connected by links 1802 in a mass spring system. The surfers 1801 carry mass, and the links propagate force over the object. When the force is temporary, the object will try to move itself back into the shape it had before the force was applied. In this case, the object has memory.

Memory is stored in the links. When we generate a surfel object, we determine the natural distance between two surfels sharing a common link. This is the rest-length 420 that is stored as one of the attributes of a surfel link, see FIG. 4. Disturbance of distance between two surfers sharing a link means a violation of the natural link length. This results in the generation of forces at the surfel level. We call this a binary force because the force is computed for a single surfel. This can done by applying Hooke's law for springs.

$$f_i=[k_s(|d|-l_0)+k_d|d'|]d^*$$

$$f_j=-f_i$$

where $f_i$ is the force that acts on surfel i, $k_s$ is the elastic component of the link, and $k_d$ is the damping factor. The rest length is $l_0$. Because the link connects two surfels, we can apply the inverse force to surfel j at the other end. When we compute $d=(x_i-x_j)$, we define a vector between both endpoints of the link.

The value $|d|$ defines the length of that vector while $d^*=d/|d|$ is the unit vector in that direction. Finally, $|d'|$ is the instantaneous change in link length. This is computed by subtracting the velocities and multiply the result by the unit vector of d: $(v_i-v_j)d^*$.

The quantity $(|d|-l_0)$ will be zero when the rest-length 10 is not violated. When this value is not zero, it will be dependent on the link's elasticity factor which multiplies the quantity of the violation.

When two surfels sharing a link move in different directions, we will get a change in the distance between the two surfels. When this distance is different from the rest-length, forces act on both surfers, because the natural length of the link is disturbed. The link will attempt to restore the two surfers back into place.

FIG. 19 shows a procedure 1900 that can be used to accumulate the forces for a surfel connected to up to eight other surfels. The procedure visits every surfel in the sequential list 600 (FIG. 6) and checks for existing links.

When we find a link, the function Compute_Force is called to compute the force that is acting on both surfels that are connected by the common link. After we have determined every force in every single surfel, we generate the derivative for the integrator.

Both the elastic and damping factors in the link can be used to tune material properties of the modeled surfel object. These quantities can be found through trial and error taking into consideration natural tensile behavior, and choosing the elastic factor accordingly.

Damping should be relative to the elasticity factor to prevent the material breaking up because of oscillations. A system is said to be critically damped when $k_d=2\sqrt{(m'k_s)}$. The value m' is the equivalent mass. Because the link is weighted by a surfel at each end of the link, we can assume that the link only "sees" these two masses, i.e., m'=m/2. In reality, the equivalent mass will be higher because links pass on their contribution to other surfels via the integrator.

Care should be taken in choosing both factors. When elasticity and damping is not properly matched, oscillations can occur which can cause a chain reaction of forces that intensifies at every integration step, with the tearing of the surface as a final result. This happens when the damping factor is not sufficient to control surfels that are moving away from each other.

Performing a Simulation

Figure 20:
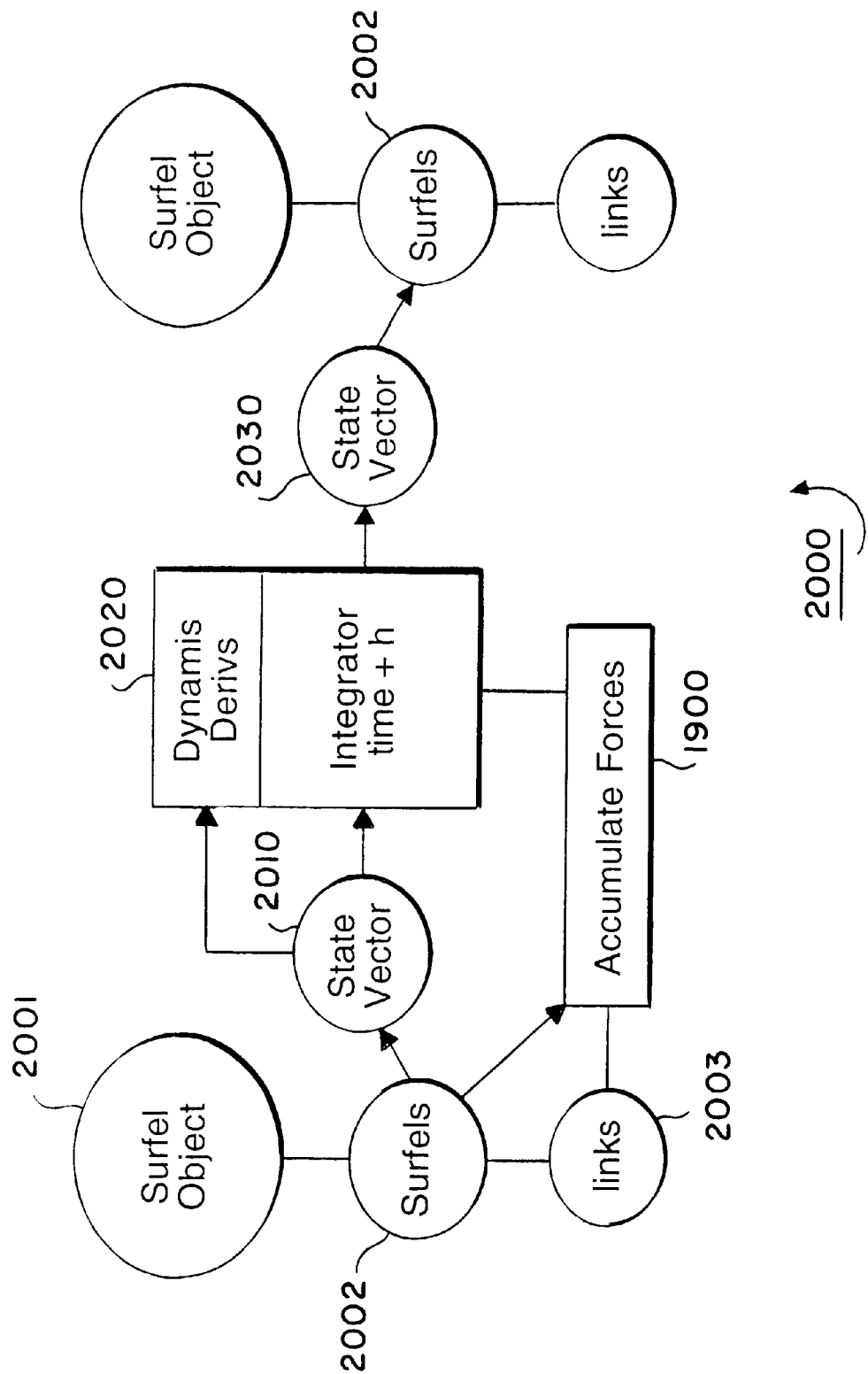
FIG. 20 is a flow diagram of a process for deforming a surfel object.

FIG. 20 shows a process 2000 for physical-based dynamic deformation of surfel objects due to, for example, collisions. A surfel object 2001 includes a plurality of surfels 2002 connected by links 2003. Because we have many surfels in a surfel object, we concatenate the state vectors of each surfel to form one large state vector 2010 of surfel positions and velocities for the complete surfel object 2001.

This results in a combined state vector of length 6n, where n is the number of surfels in the object. The forces are accumulated by procedure 1900, and integrated in step 2020 to generate a new state vector 2030 which can be used to update the states of the individual surfels 2002.

FIG. 21 shows a wrapper procedure 2100 that can be used with the process 2000 of FIG. 20. This procedure generates the state vector 2010 and invokes the process 1900 that accumulates the forces at every surfel. The wrapper 2100 also invokes the integrator 2020. The error scale measures the amount of allowable error.

4.2.2 Determining Surfel Normals After Deformation

Because surfels are no longer constrained to the pixel grid while deforming, we may have to reconsider surfel offsets and normals after deformation. Surfel offsets can change because the offsets measure the distance to the previous surfel in the sequential list, these can be recomputed for any surfels that have new positions.

Figure 22C:
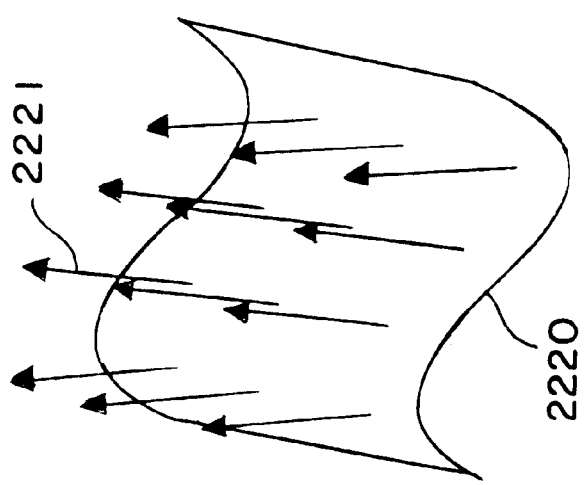
FIGS. 22a, 22b, and 22c show surface normals during deformation.
Figure 22B:
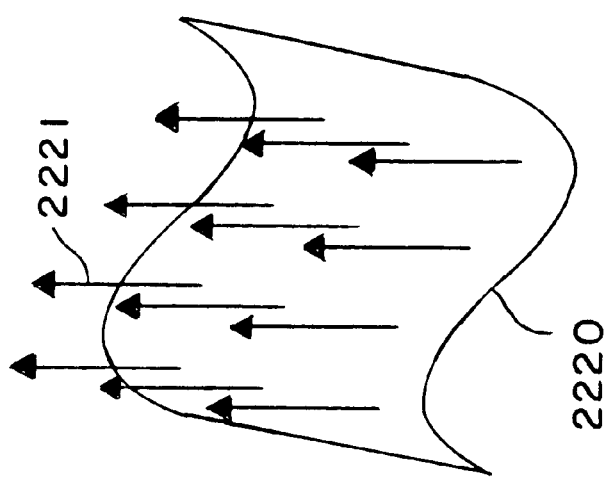
Figure 22A:
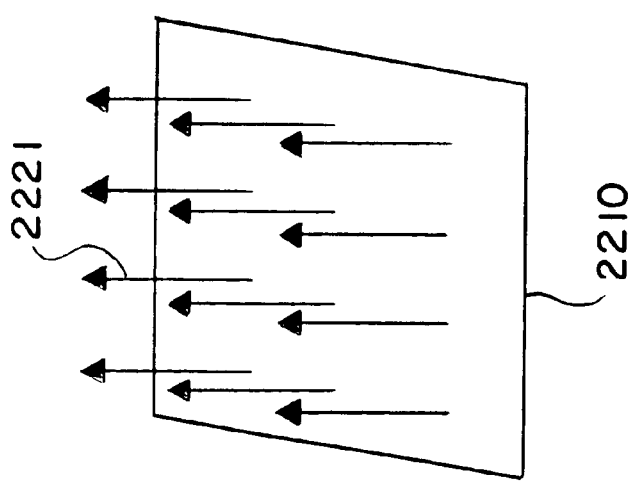

A bigger problem is the fact that surfel normals do not change during the simulation of deformation as shown in FIGS. 22a–c. FIG. 22a shows a portion 2210 of a surfelized polygon with surfel normals 2211. With the deformed portion 2220 as shown in FIG. 22, the surfel normals 2211 are still as before the simulation. This would clearly result in a wrong representation when the surfel object is rendered. The correct normals 2221 for the portion are shown in FIG. 22c.

The normals 2221 can be found from the tangent planes that pass through the deformed surfels. Because the surfels are connected, two non-colinear vectors that lie in the tangent plane can be found for the two nearest adjacent surfels. The nearest adjacent surfel can be found from the surfel links.

5. Rendering Surface Elements

After surfel objects have been modeled, they can be rendered on a display device or a printer. As stated above, surfels have a close similarity with (surface) voxels. Both are defined on a grid. The typical definition of voxels considers them to be values, or samples, that are located at the integer grid positions of a volume. Each surfel, according to the invention, projects to one pixel on the image plane. Overall, we use an object-order rendering projection process. Because of the one-to-one mapping of surfels to pixels, no rasterization is needed.

We facilitate zooming, i.e., changing the distance between the surfel object and the image plane, by having surfel representations at various levels of detail. In this case, when more or less than one pixel project to one pixel, a representation with a corresponding level of detail is selected to maintain the one-to-one mapping between surfels and pixels.

Figure 23:
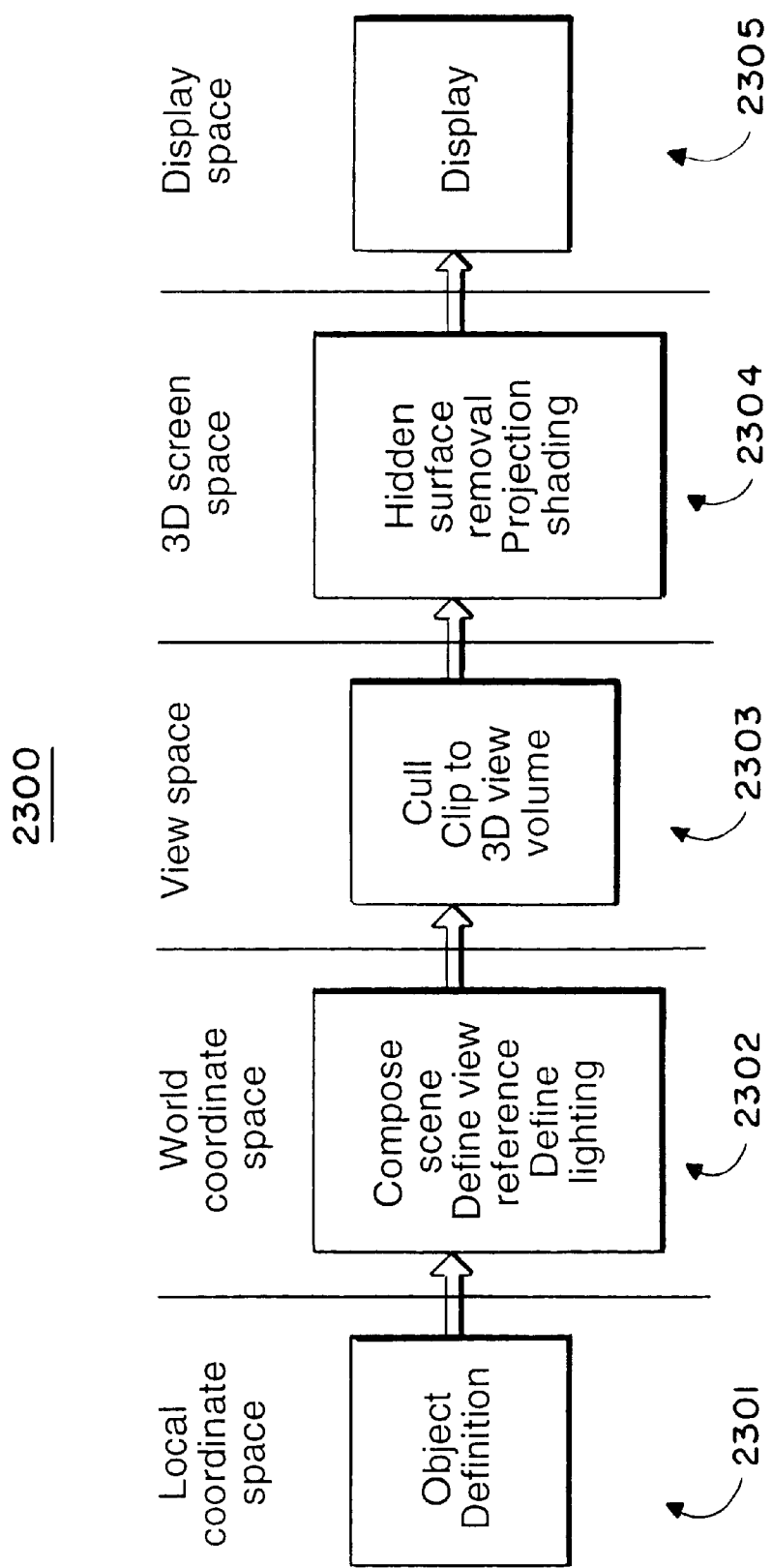
FIG. 23 is a flow diagram of a surfel rendering pipeline.

FIG. 23 shows a rendering pipeline 2300 for surfel objects. The pipeline 2300 has five stages 2301–2305 operating in corresponding coordinate spaces. While rendering, each surfel S can be defined as a 13-tuple vector including:

$$S=\{x,y,z,o_x,o_y,o_z,n_y,n_z,r,g,b,a\}$$

where xyz is the surfels' position, o is the offset, n is the surface normal, and rgb the surfels' color, and a is the opacity of the surfel, see FIG. 4.

The renderer 2300 starts with the first surfel in the list 600 of FIG. 6. If this surfel is not clipped due to the camera position, then the surfers'position is transformed from world coordinates to view coordinates, according to a viewing matrix M.

Because only parallel projection is considered, the transformations are affine, and no perspective division is needed. For the first surfel, the view coordinates are clipped against the clipping boundaries determined by the camera. The clipping boundaries include a near and far plane, and the view-port dimensions, which are provided with the camera-description. If the surfel is within those clipping boundaries the surfel is checked against the depth-buffer.

To simulate the illumination of a surface by a light source, shading calculations are performed for the surfels. One way of modeling the illumination of a light-source is by applying a local illumination model for each surfel. The best results with a local illumination model are obtained with well known Phong shading, which we use. Phong shading uses the material properties of the objects in its calculations to provide a high quality shading for objects.

5.1 Object-Order Projection

To determine to which pixel a surfel projects, we perform a $0^{th}$ order, or nearest neighbor interpolation. A center of a pixel (x, y) is considered to be located at (x+0.5, y+0.5). Nearest neighbor interpolation, in this case, means that a pixel position is found by only considering the integer part of the surfels' x and y view coordinates.

The view coordinates of each consecutive surfel are found by transforming the offset of the surfel to a screen-space offset. The view coordinates of the surfel under consideration are then relative to those of the previous surfel. As stated above, many of these offsets will be the same, so already transformed offsets can be stored in a lookup-table and retrieved as needed. Calculating an index into this lookup table requires less calculations than calculating the view coordinates directly using the viewing matrix. Transforming homogeneous coordinates to view coordinates directly with parallel projection requires a total of 18 operations (multiplications and additions).

Using the offset to determine the view coordinates of a surfel, requires the transformation of the first surfel using the viewing matrix. For orthographic projections each next surfel's view coordinates can be found by adding the view-transformed offset. For surfels that have 8-connectivity, the possible offset-combinations are $\{\pm 1,0,0\}$, $\{0,\pm 1,0\}$, $\{0,0,\pm 1,\}$.

The view-transformed offset can be pre-calculated and stored in a lookup table that is uniquely indexed using, for example:

$$\text{index}=o_x+3\cdot o_y, +5\cdot o_z+5$$

where the o means offset. This lookup only requires 2 multiplications and 3 additions. Another 3 additions are needed to add the view-transformed offset to obtain the view-coordinates, so a total of 8 operations are needed per surfel.

5.2 Jagged Edges, Terraces, and Holes

Figure 24A:
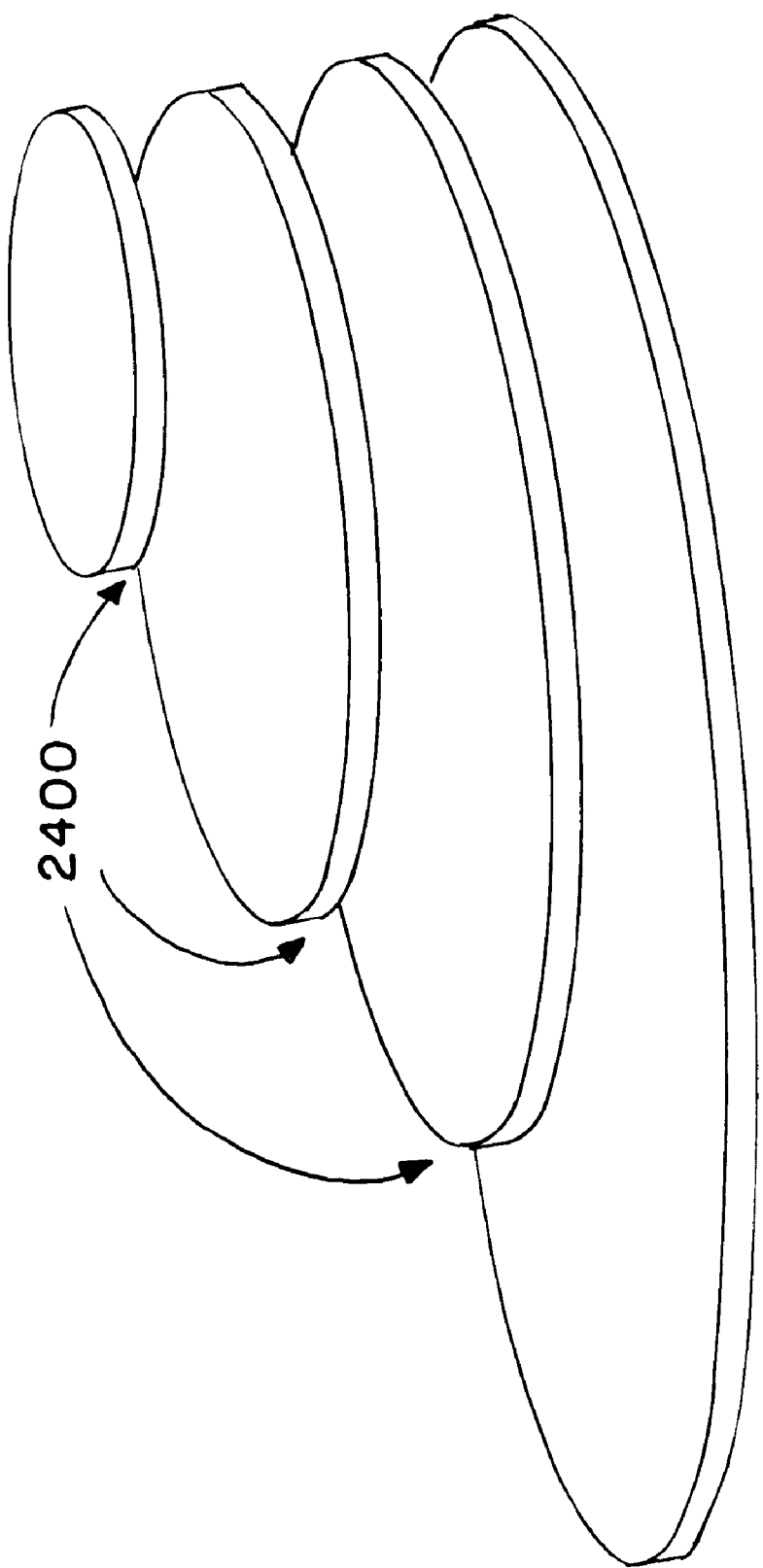
FIGS. 24a–c show rendering artifacts.

The images generated from surfel representations suffer from aliasing artifacts such as jagged edges and terracing effects 2400 as shown in FIG. 24a. There are two reasons for this. First, surfels are considered point samples located in a cell with pixel dimensions. The sampling rate of the projection is not high enough to reconstruct the shape without the jagged edges.

Second, only one surfel projects to a pixel, although for certain orientations of an object more surfels will project to a pixel so eventually only one will contribute its value to the pixel. The other surfels will be eliminated by the depth-buffer. Jagged edges are a known problem of using the depth-buffer. The "jaggies" and terraces can also appear at regions with high spatial frequencies in the objects'color. Aliasing artifacts can be reduced by a splatting technique described in greater detail below.

Figure 24C:
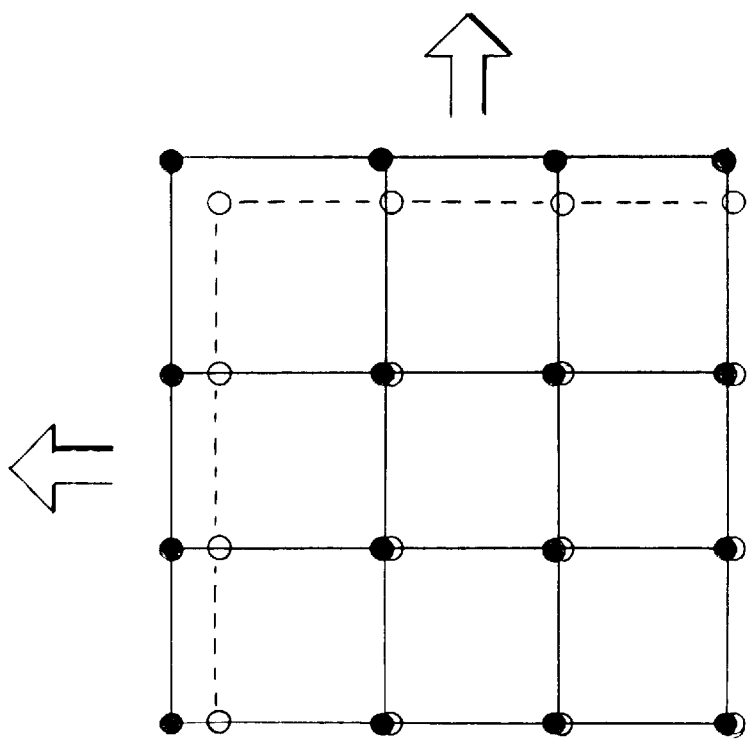
Figure 24B:
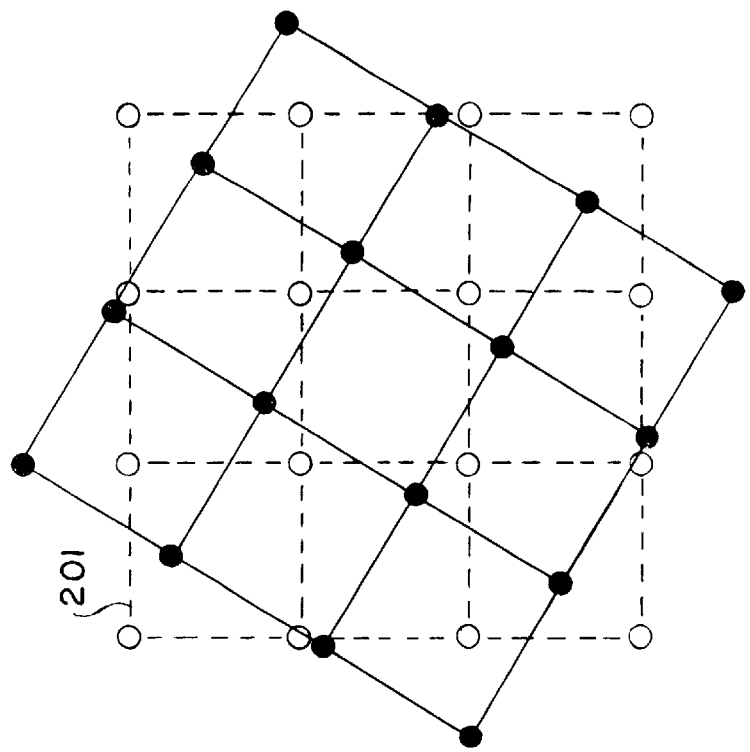

As shown in FIGS. 24b and 24c, another problem with the rendering of deformed surfels using a nearest neighbor interpolation projection is holes. Holes appear when an object is rotated around an axis that is most parallel to the viewing direction, or when the object is deformed. We provide the following solutions to the "holes" problem.

In FIG. 24b, the broken line grid with open surfels is the original position, and the solid line grid with solid surfels is the position after reorientation. After orientation, the central grid position (pixel) no longer has a corresponding surfel. This would result in a hole in the rendered image. In FIG. 24c, a portion of the grid is deformed in two directions leaving a hole at screen (pixel) position.

Holes are a serious drawback for our one-to-one image plane to surfel mapping, because the holes must be "filled" using adjacent surfels. This may require more operations per surfel, so the processing time will increase. We provide solutions to the "holes" problem in the description below.

5.3 Shear-Warp Rendering of Surfels

One solution renders surfel objects using shear-warp factorization. The shear-warp factorization is based on the observation that the viewing transformation can be divided in two separate stages, a shear followed by a warp:

$$M_{view} = P \cdot S \cdot M_{warp},$$

where P is called the permutation-matrix, S is the shear-matrix and $M_{warp}$ is the warp-matrix. In sheared object space, the projection to the base-plane is orthogonal to a so-called base-plane.

Figure 25:
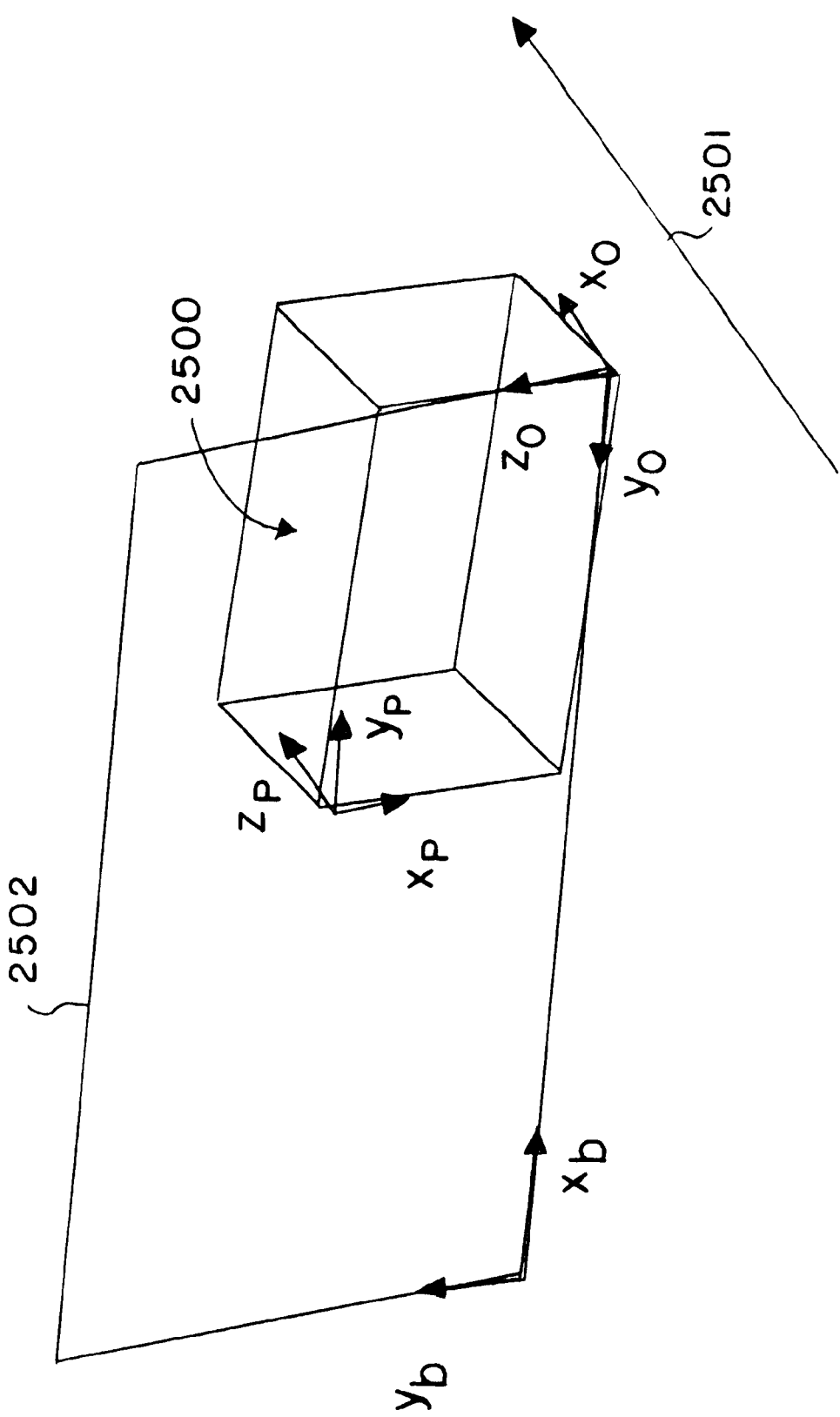
FIG. 25 is a graph showing shear-warp factorization.

As shown in FIG. 25, the factorization, in general, includes three steps. First, for any volume 2500, a major axis ($x_0$) that is most parallel with the viewing direction 2501 is determined, and a base-plane 2502, or intermediate image is defined for which the major axis is perpendicular. This axis is assigned the viewing direction for the base-plane. Defining the coordinates in this space is performed by a permutation using P. The space is called permuted space. The base-plane is coincident with one of the faces of the bounding box, and hence with a part of the object.

Figure 26B:
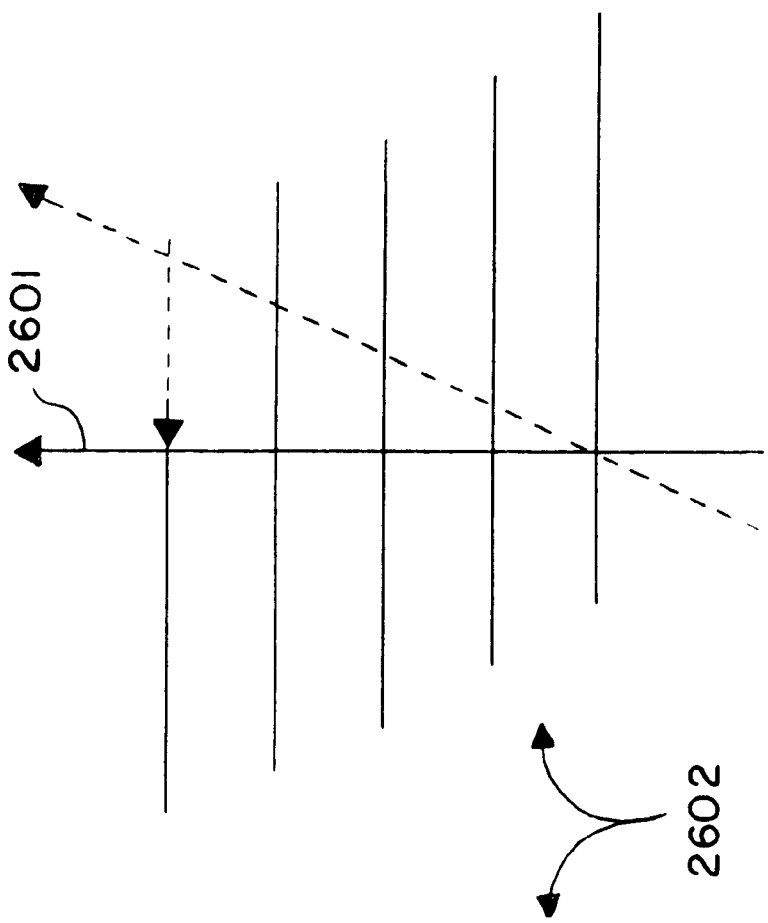
FIGS. 26a and 26b are graphs of voxel slices before and after shearing.
Figure 26A:
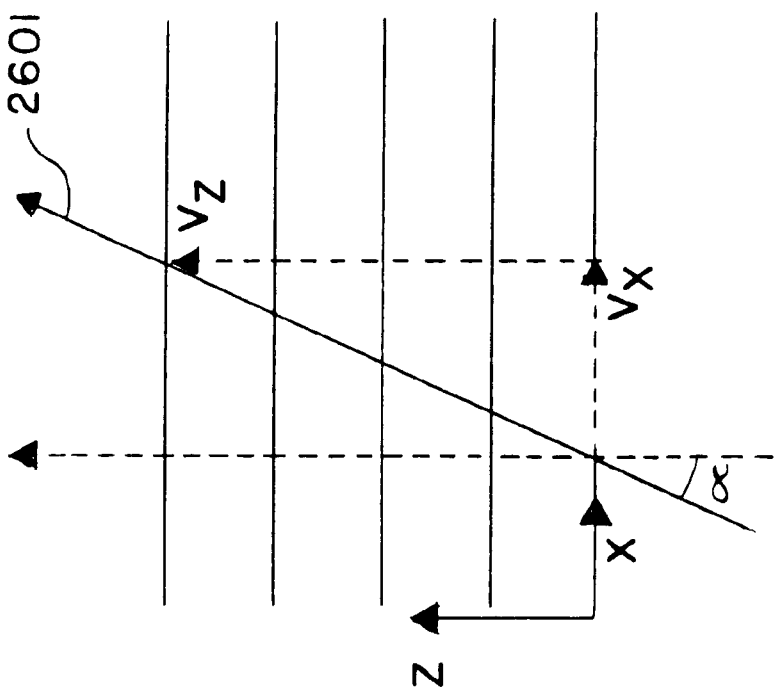

Defining a viewing direction, that is perpendicular to the base-plane and every slice of voxel requires that the object be sheared as shown in FIGS. 26a–b. In FIGS. 26a–b, line 2601 is the viewing direction, and the parallel lines 2602 are slices. The shearing is calculated according to $-V_x/V_z$. In 3D, the shear will be performed for the y-direction as well. The object coordinates are transformed to sheared coordinate space using S. Shearing a volume requires a re-sampling of the voxels.

Second, the object is projected onto the base-plane 2502, resulting in an intermediate image. With objects for which the shear-warp transformation was originally developed, some properties of the sheared volume can be exploited, improving the rendering speed. One such property is that slices are parallel to pixel-runs on the base-plane.

Figure 27:
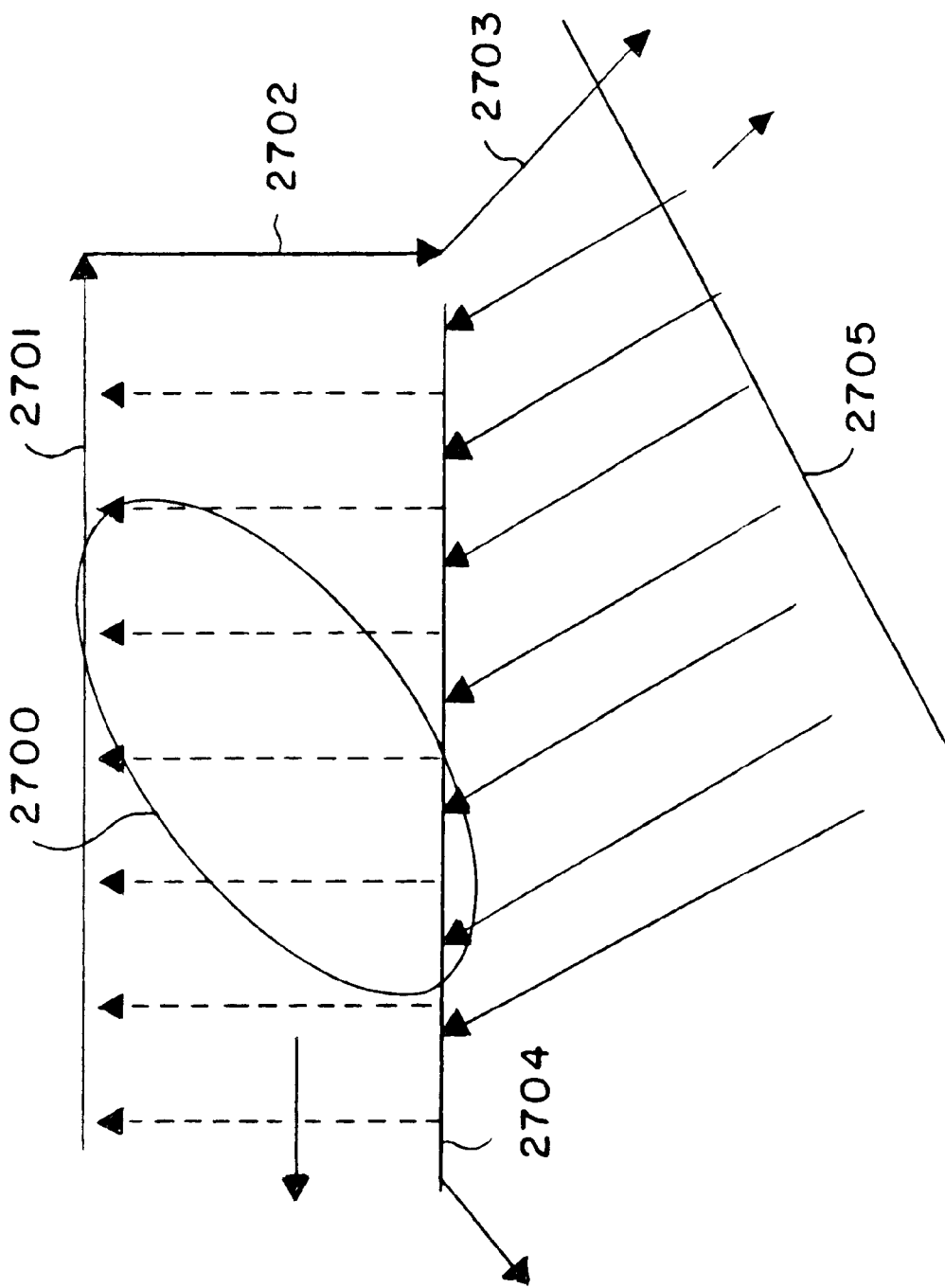
FIG. 27 is a graph showing warping to an image plane.

Third, as shown in FIG. 27, the intermediate image is warped to the final image according to the warp-matrix. In FIG. 27, arrow 2701 is the shear, arrow 2702 the projection, arrow 2703 the warp, oval 2700 the object, originally a sphere, line 2704 the base-plane, and line 2705 the image plane.

We apply shear-warp factorization to surfel objects as follows. The shear step changes the shape of an object. However, there will be no holes in the base-plane image. This can be explained using FIG. 26. The slope of the viewing direction in 2D has its maximum value of 1.0 when $V_x$ and $V_z$ are equal. In other words, the angle of the viewing direction with the direction perpendicular to the object is maximally 45°, because as the angle gets larger, a different major axis is taken to be the perpendicular axis to the object.

Figure 28B:
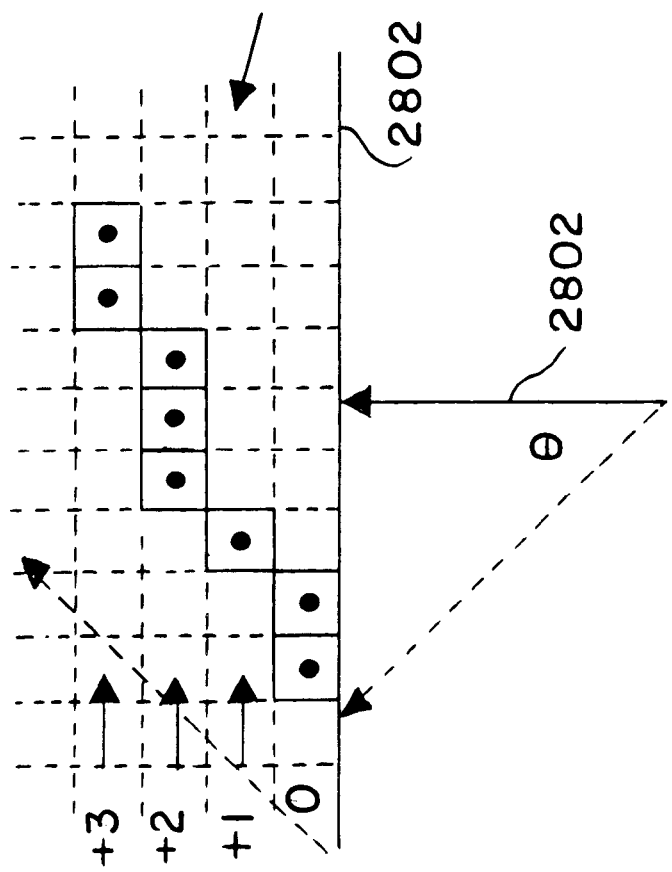
FIG. 28 is a graph of a shear-warped pixel grid.
Figure 28A:
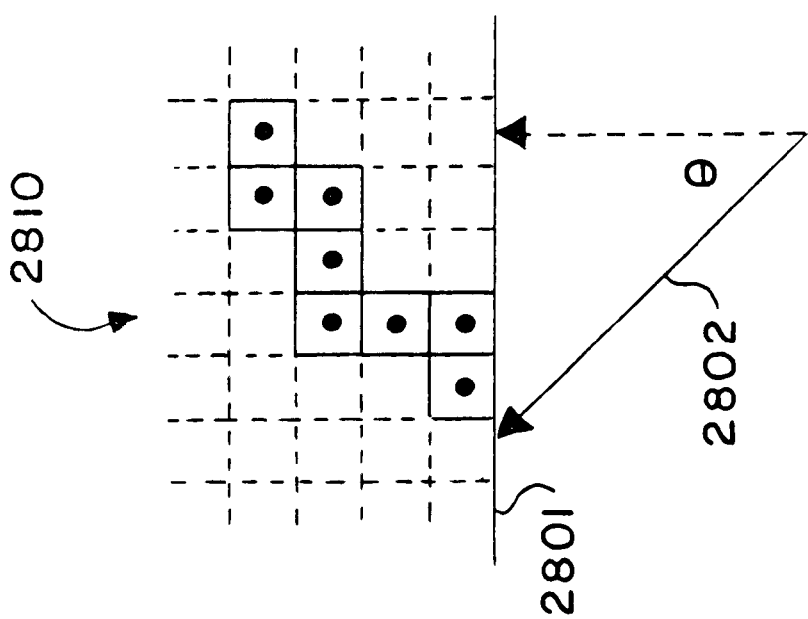

Because objects are sheared according to the slope, the shear in a direction is also maximally 1.0 and therefore every pixel will get a contribution from a surfel as is shown in FIGS. 28a–b where lines 2801 are base-planes, arrows 2802 are viewing directions, grid 2810 is in object space, and grid 2802 is the pixel grid in sheared space. Performing the different stages of the shear-warp eventually results in the viewing transformation.

Holes in the final image can be prevented by defining the image of the base-plane, which does not contain holes, to be a texture map. This texture map is then used in texture mapping a plane which will be warped to become the final image. This warp can be thought of as some plane defined in its object space that is transformed according to the warp-matrix. The transformed and texture mapped plane is then rendered to the screen.

5.4 Scaling

To guarantee that every pixel which lies inside the surfel-object's extent on the image plane will have at least one surfel associated with it while retaining a nearest neighbor filtering, the object can also be scaled. This scaling should be uniform to maintain the pixel-sized spacing in all three directions. What needs to be determined is the scale-factor with which the object should minimally be scaled.

The pattern of holes in an object will depend on the rotation-angle. The patterns that appear for rotations between 45° and 90° are the same as the patterns that appear for rotations between 0° and 45°, except that they are mirrored with respect to the line of the 45'-rotation. This is true for the full 360° rotation, where for each 45'-rotation interval the pattern of holes will re-appear either exactly the same as the pattern for the interval 0°–45°, or as a mirrored pattern.

Now the scale-factor can be determined by considering a pixel, with a cell that contains a surfel mapped to it. The 2D projection of the cell exactly matches the size of the pixel when the cell is not rotated. However, if the 2D projection of the cell is rotated around the center of the pixel, the corners of the cell will be outside the pixel boundaries, see FIGS. 29a–c.

Figure 29C:
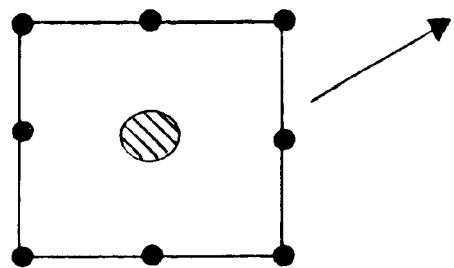
FIGS. 29a, 29b, and 29c are graphs of scaled surfels.
Figure 29B:
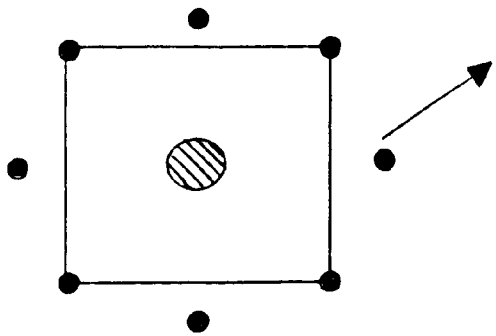
Figure 29A:
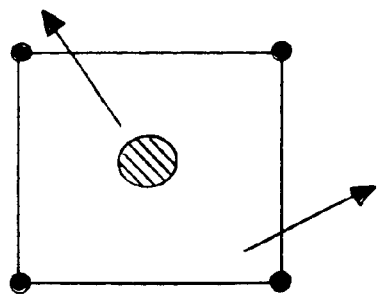

In FIG. 29a, a surfel is mapped to a pixel, in FIG. 29b the surfel is rotated by 45 degrees, and in FIG. 29c the surfel is scaled by ½√2. The maximum distance of the corner of the 2D projection of a cell to the pixel boundaries will occur with a rotation of 45°. Assuming a pixel is a unit square, the distance from the center of the pixel to the corner in that case is ½√2. To ensure that the corners of the projection are on the pixel boundaries, the scale-factor also has to be ½√2. When scaled by this factor the distance from the center of the pixel to the comers of the projection of the cell is ½. This guarantees that for each pixel in the extent of an object at least one surfel per pixel will contribute a value.

Obviously scaling results in a smaller object on the screen, so in order to retain the size of the object, a bigger object should be generated. For example a sphere with the radius of 100 surfers will have a radius of 100 pixels without scaling. If the sphere is scaled, then the radius of the sphere will have to be 100·√2 to obtain a rendered sphere with a radius of 100 pixels.

The principle of generating a higher resolution object and then rendering a smaller resolution of the object is equivalent to supersampling. Here, the word scaling is used as to denote that the supersampling is applied to surfel objects.

5.5 Splatting

Figure 30B:
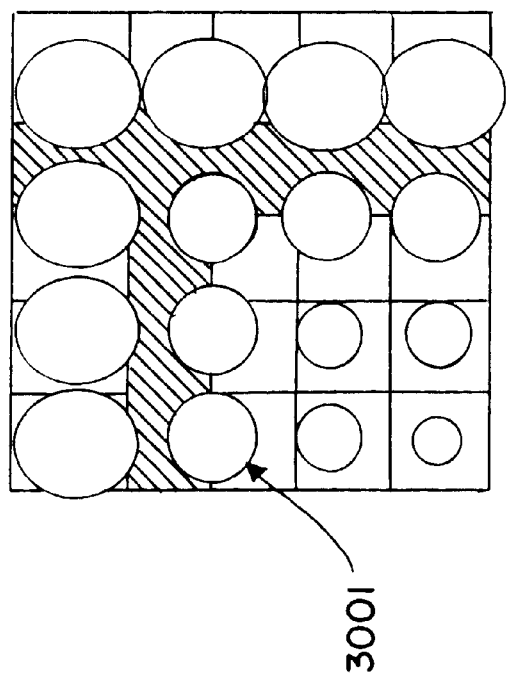
FIGS. 30a and 30b show splatted surfels.
Figure 30A:
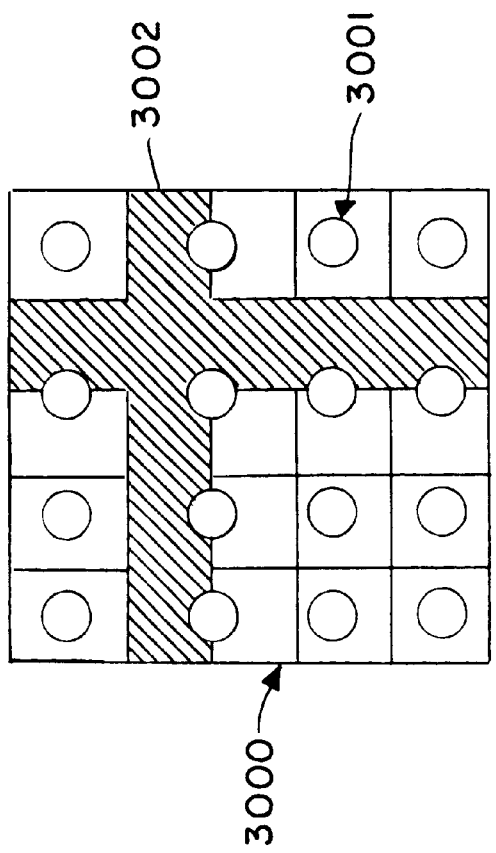

The third solution to the aliasing and hole-problem is to use splatting as shown in FIGS. 30a and 30b. In FIG. 30, pixel grid 3000 maps to surfels 3001. There is a "hole" at grid location 3002. In FIG. 30b, the surfels are enlarged proportionally to fill the hole.

With splatting the contribution of a surfel is enlarged or "spread" to multiple pixels according to a reconstruction "kernel." The process is based on techniques from digital image processing, where a reconstruction function is used to reconstruct the signal from sampled data.

Around a sample, a unit sphere (the unit region sphere) is defined. The sphere represents a reconstruction kernel in 3D. When projecting the sample to the screen, the extent of the sphere is a circle. For every pixel (x, y) within the circle a contribution of the sample is calculated by integrating the reconstruction kernel along the z-axis, i.e., the viewing axis. Except for an offset, the extents are all similar for samples and therefore the integrations can be replaced with a so-called generic footprint table.

The integration of the reconstruction filter is approximated by a Gaussian function of the form $e^{-(x^2+y^2)/2\sigma}$. This function is rotationally symmetrical and linearly separable which means that the function can be integrated separately in each direction and the results can be multiplied to obtain the total integration. These properties are needed to build a generic footprint table using a Gaussian.

To build the generic table, the 3D kernel, i.e., the unit region sphere, is projected onto a plane and this projection is a circle, the unit region circle. The unit region circle is then sampled on a table with many entries, e.g. 100×100, using the Gaussian filter, where table entries that do not fall within the unit region circle have zero-value.

Since a volume does not necessarily have equal spacing in all three directions, the unit region sphere may be transformed to an ellipsoid for a particular view, and therefore the projection of the filter for a particular view can become an ellipse. Instead of using the generic footprint table for the ellipse, a so-called view-transformed footprint table is built once from the generic footprint table.

To use the view-transformed table, the renderer needs to make two calculations. First, the extent in pixels will have to be calculated for the view-transformed footprint table. Second, a mapping from the view-transformed footprint table to the generic footprint table will have to be calculated.

The extent in pixels is calculated using the width of the kernel or spread. The mapping from the view-transformed table to the generic table is either a mapping from circle to circle, or in case the unit region sphere is transformed to an ellipsoid for a particular view, the mapping is from an ellipse to a circle.

During rendering, the view-transformed footprint table is centered at the sample's image position. One additional parameter is needed to use the view-transformed footprint and this is the dimension of the table. The dimension is different than the extent of the table. The dimension of the table determines the number of entries for the view-transformed table. The dimension of the view-transformed table should be larger than the number of pixels it covers, otherwise aliasing artifacts will occur in the image. View-transformed tables with a large extent, as well as a large dimension, will result in a blurry image of an object. The view-transformed footprint table is sampled for each pixel-center of the pixels that lie within the extent of the view-transformed footprint table, and the weight at the particular table-entry is used to calculate the contribution to a pixel.

We apply the general splatting process to surfels, as follows. In volumes, as shown in FIG. 30a, the grid spacing is not necessarily equal in all three directions, and depends on the type of acquisition. Also, the resolution of the output samples (pixels) is usually higher than the resolution of the input samples (voxels). For this reason a grid-scale factor and pixel-voxel ratio are accounted for in the formulae to calculate the extent of the view-transformed table.

However, for surfels, these two factors are both equal to one. Therefore, the view-transformed footprint tables' dimension can be relatively small. A reconstruction kernel with radial extent of 1.5 will result in a screen extent of 3 pixels. Dimensions of 5×5 to 10×10 are sufficient for splatting applied to surfels.

The renderer starts by projecting a surfel to the screen, and the view-transformed footprint table is centered at the x, y position on the screen. For each pixel-center that falls within the tables' extent, the table-entry for that pixel is determined and the weight at that entry is applied to the pixels' value.

Comparison of Shear-Warping, Scaling, and Splatting

Shear-warp has the advantage that the projection of the object to the base-plane is always performed with a 3D grid that is axis-aligned with the base-plane. To prevent holes from appearing in the final image, the warped base-plane image needs to interpolate the values of its pixels. A disadvantage of the shear-warp is that each object in a scene has to be rendered to a separate image, and the resulting images have to be blended to compose a final scene. This is complex and introduces overhead.

Scaling the object prior to rendering can cause multiple surfels to project to a single pixel. The original rendering process is applied to render the objects, with the property that only one surfel eventually will contribute its value to the pixel and that surfel will be the one with the smallest depth-value. We believe that scaling the object with a factor ½√2 results in at least one surfel per pixel. Scaling requires the generation of initially bigger objects, since the scaling will result in smaller ones on the image plane.

Our last solution to the holes problem is splatting the contribution of a surfel to a neighborhood of pixels. The value of a surfel is weighed according to a filter associated with each surfel and the weighed values are assigned to the pixels. The image results by accumulating all the contributions to the pixels. Holes will thus be filled by the contribution of surrounding surfers to the pixel, provided that the spread of the surrounding surfels is large enough. Splatting anti-aliases the jagged edges and terraces on the surface of the object because splatting inherently blurs the colors of an object. If the spread of a surfel becomes too large, the amount of blurring will also become too large.

The splatting technique can be used to provide the surfel representation with a fast rendering technique and the ability to deform objects without constant re-sampling. Because initially the surfels of an object are 8-connected, and therefore, at most only maximally one pixel in distance away from each other, the tables used in splatting can be kept relatively small. Tables with extents of 6×6 and 8×8 pixels are enough to fill the holes.

When the object is deformed to cause large holes to occur in its surface, the object does not have to be re-sampled immediately. First the extent of the splatting kernel can be enlarged to fill the larger holes. Extents that are too large slow down the rendering considerably, and therefore, an occasional resampling of the object might be needed, or the local generation of surfels at positions of large holes in a surface.

This invention is described using specific terms and examples. It is to be understood that various other adaptations and modifications may be made within the spirit and scope of the invention. Therefore, it is the object of the appended claims to cover all such variations and modifications as come within the true spirit and scope of the invention.

We claim:

1. A method for modeling a representation of a graphic object in a memory, comprising:

partitioning a surface of the object into a plurality of cells having a grid resolution related to a resolution of an image plane;

storing a single zero-dimensional surface element in the memory for each cell located on the surface of the object;

connecting the surface elements in adjacent cells by links;

assigning attributes of the portion of the object contained in the cell to each surface element and each link;

moving the location of the attributed surface elements to a new location according to forces acting on the object; and rendering the attributed surface elements at the new location on an output device.

2. The method of claim 1 wherein the object attributes assigned to each surface element includes a position of the surface element on the surface of the object, a velocity of the element, and a mass of the portion of the object contained in the corresponding cell, and wherein the object attributes assigned to each link includes a rest length of the distance between two adjacent surface elements connected by the link.

3. The method of claim 2 wherein the location of the surface elements are moved according rigid body mechanics.

4. The method of claim 2 wherein an initial location of each surface element representing the object is described by three-dimensional coordinates in a world space coordinate system, and an orientation of surface cells is described by four variables of a quaternion.

5. The method of claim 4 wherein quaternion reflects a three-by-three rotation matrix.

6. The method of claim 4 wherein the location of the object with a fixed orientation in the world space over time depends on a linear velocity.

7. The method of claim 5 wherein the location of the object in the world space over time depends on an angular velocity when the object is rotating.

8. The method of claim 6 wherein the location, orientation, linear velocity, and angular velocity is expressed by a state vector $$x(t) = q_s, q_x, q_y, q_z, x_x, x_y, x_z, v_x, v_y, v_z, \omega_x, \omega_y, \omega_z.$$

9. The method of claim 8 including updating the state vector for each step in time while the object is moving.

10. The method of claim 2 wherein the location of the surface elements are moved according to unconstrained object motion.

11. The method of claim 10 wherein the object responds to a collision with another object by exchanging energy and momentum between the two objects.

12. The method of claim 11 wherein the object is represented by a polyhedron bounding box to determine a region of interest on the surface of the object, and searching for colliding surface elements within the region of interest.

13. The method of claim 2 wherein the object attributes assigned to each cell includes an elastic and damping constant associated with the link to dynamically deform the object.

14. The method of claim 13 wherein the movement of the object is modeled by a mass-spring system wherein each surface element has mass, and each spring has associated elastic and damping constants.

15. The method of claim 13 wherein the attributes of each surface element includes a surface normal, and wherein the surface normals are recomputed after deforming the object.

16. A system for modeling a representation of a graphic object in a memory, comprising:
   means for partitioning a surface of the object into a plurality of cells having a grid resolution related to a resolution of an image plane;
   a memory storing a single zero-dimensional surface element for each cell located on the surface of the object;
   means for connecting the surface elements in adjacent cells by links;
   means for assigning attributes of the portion of the object contained in the cell to each surface element and each link;
   means for moving the location of the attributed surface elements to a new location according to forces acting on the object; and
   means for rendering the attributed surface elements on an output device.

* * * * *